Oct. 3, 1939.   F. M. CARROLL ET AL   2,174,685
ACCOUNTING MACHINE
Filed Sept. 15, 1934   10 Sheets-Sheet 1

Oct. 3, 1939.  F. M. CARROLL ET AL  2,174,685
ACCOUNTING MACHINE
Filed Sept. 15, 1934  10 Sheets-Sheet 2

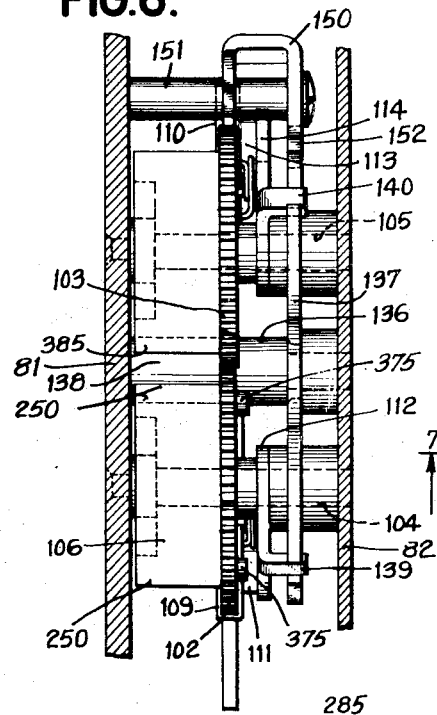

Oct. 3, 1939.  F. M. CARROLL ET AL  2,174,685
ACCOUNTING MACHINE
Filed Sept. 15, 1934  10 Sheets-Sheet 5
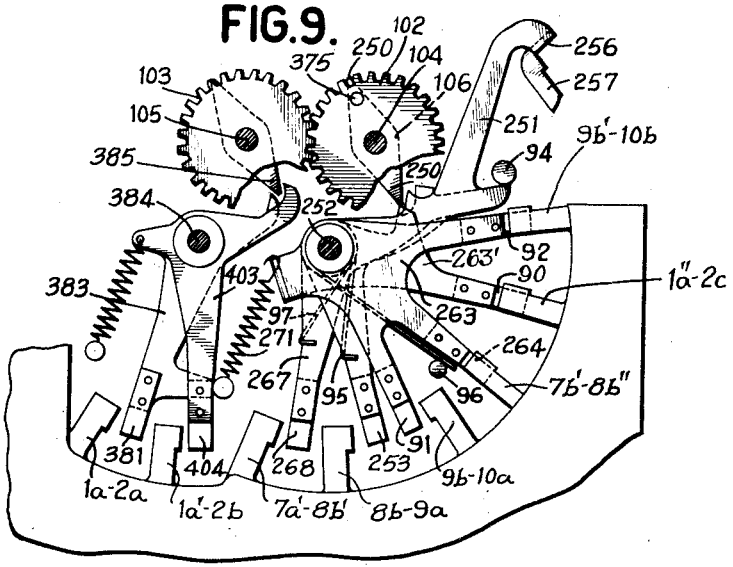
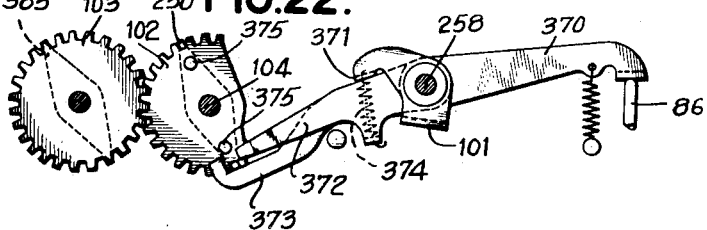
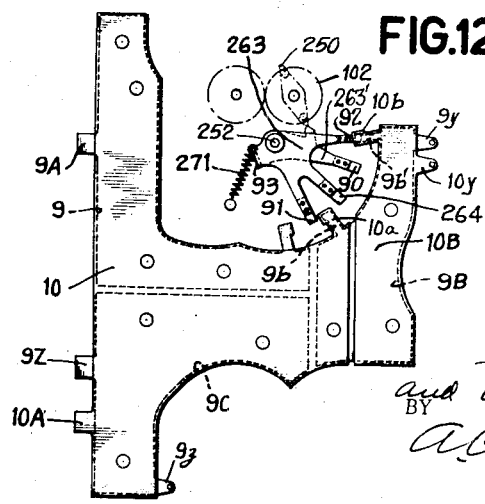

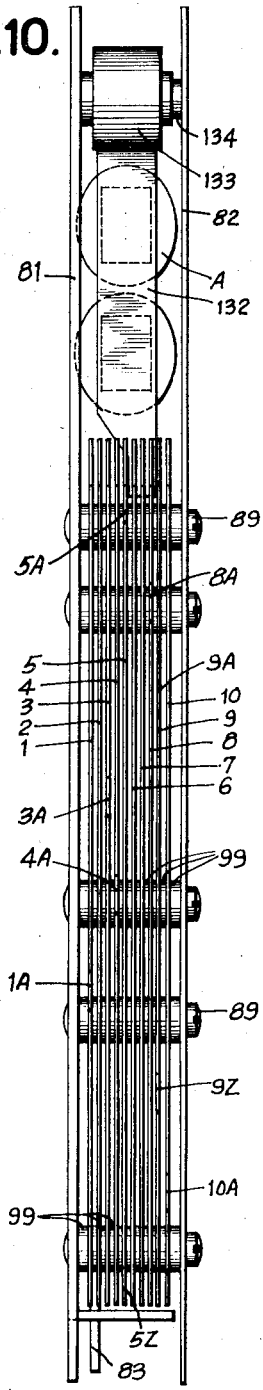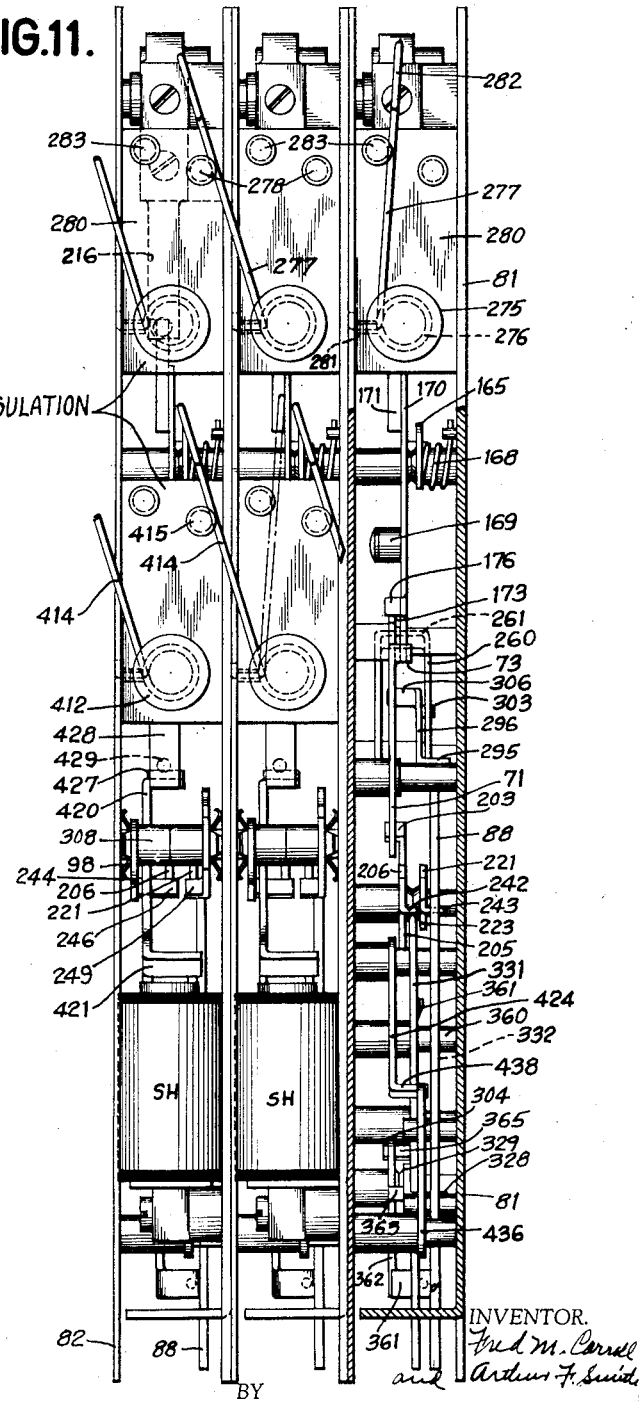

Oct. 3, 1939.  F. M. CARROLL ET AL  2,174,685
ACCOUNTING MACHINE
Filed Sept. 15, 1934    10 Sheets-Sheet 7

INVENTOR.
Fred M. Carroll
and Arthur F. Smith
BY
A. C. Maby ATTORNEY.

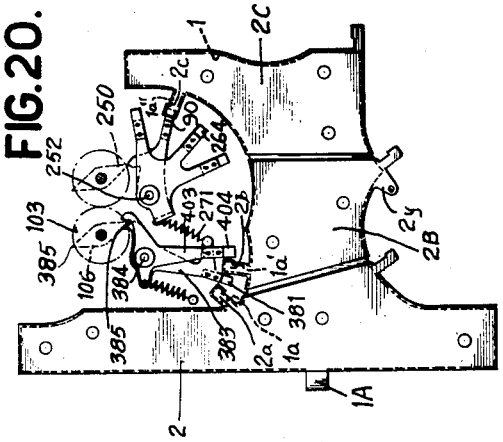
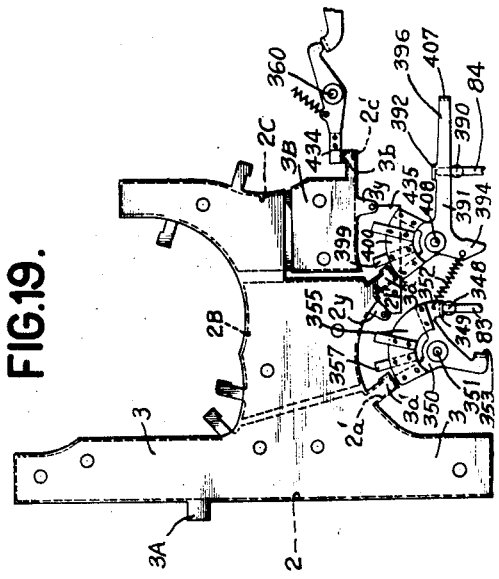
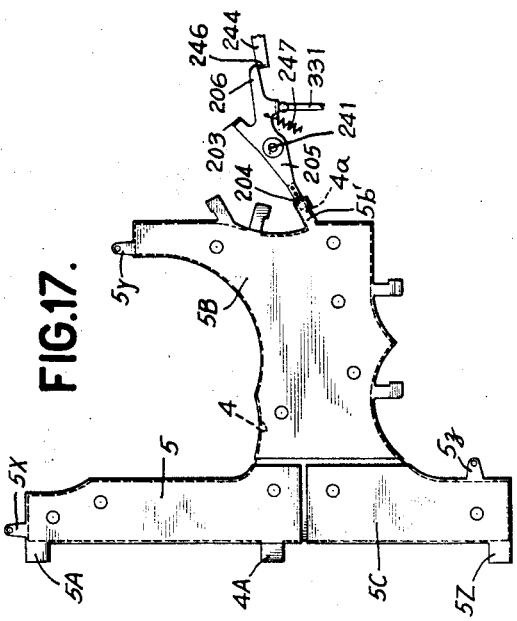

Oct. 3, 1939.  F. M. CARROLL ET AL  2,174,685
ACCOUNTING MACHINE
Filed Sept. 15, 1934   10 Sheets-Sheet 9

INVENTOR.
Fred M. Carroll
and Arthur F. Smith
BY
A. Curaby ATTORNEY

Oct. 3, 1939.   F. M. CARROLL ET AL   2,174,685
ACCOUNTING MACHINE
Filed Sept. 15, 1934   10 Sheets-Sheet 10
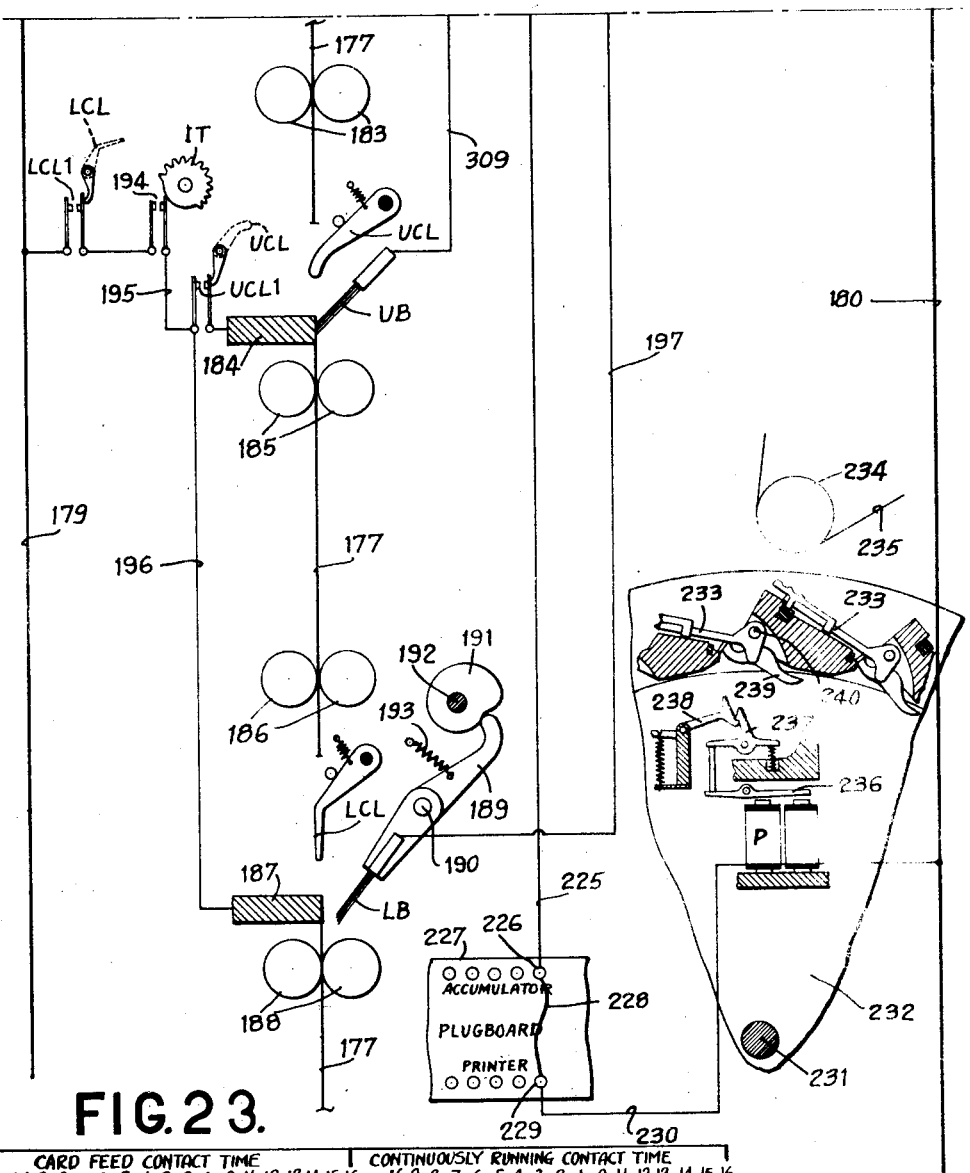

Patented Oct. 3, 1939

2,174,685

UNITED STATES PATENT OFFICE 2,174,685

ACCOUNTING MACHINE

Fred M. Carroll, Binghamton, and Arthur F. Smith, Endicott, N. Y., assignors to International Business Machines Corporation, New York, N. Y., a corporation of New York Application September 15, 1934, Serial No. 744,134

12 Claims. (Cl. 235—61.8)

This invention relates generally to improvements in accounting machines and more particularly to an advanced form of adding and subtracting accumulator. The devices of the invention are embodied in a machine which is controlled by perforated record cards.

An object of the invention is to provide an electrically controlled balance accumulator which is adapted for operation at high speed.

Another object of the invention is to provide an accumulator which may be controlled by a rapid succession of timed impulses.

A feature of the invention is the operation of an accumulator under control of an armature oscillated between two magnets. Speedy operation is obtained by utilizing each vibration of the armature as a driving stroke for operating the accumulator.

Another object of the invention is to provide a reversing means for an impulse controlled type of accumulator in order that subtraction and negative balancing may be performed without changing the mode of operation of the driving means.

Another feature of the accumulator in the present invention is the design of the parts for easy assembly whereby the mere placement of parts one over the other holds them in place and joins them for operation.

An object of the invention is the provision of improved negative balance reading correction devices. By means of these devices a single wheel rotated in either direction serves to control the printing of true numbers representing a positive or negative balance. Delayed impulse initiating devices and selection devices therefor are used in the printing of a negative balance so that in all orders higher than the order with the first significant digit a correction is made to reduce by one unit the reading which would otherwise be wrong.

A feature of the invention is the provision of compactly arranged switch plates having projections that form the blades of a knife switch. The projections from an adjacent pair of plates cooperate in the formation of a switch.

Another object of the present invention is to provide movable accumulator units, each representing a denominational order and each capable of operation in addition, subtraction, and the printing of a balance. The removable accumulator units are provided with simple switching devices for carrying the transfer control impulses from lower to higher orders and negative balance correcting impulses from order to order. These switching devices between the units may be selectively connected or held out of contact so that a certain number of the units are split off in a section adapted for individual accumulation.

Another object of the invention is the provision of a control cabinet for receiving the assembled accumulator units. This cabinet contains a plurality of control devices common to all of the assembled accumulator orders. The only connection between the control devices and the accumulator unit is through contacts made when a unit is assembled in the cabinet. Because of this construction, any accumulator unit may be removed without disconnecting any mechanical part or loosening any wires.

Another feature of the present invention is the connection of the control devices in the control cabinet by wiring and the operation of the devices in the cabinet under control of timed impulses.

The only connection between the driving means and the control cabinet is a cable or wire carrying the driving control impulses from the driving means to the accumulator and otherwise carrying the printing control impulses from the accumulator back to the driving means for the control of item printing and total printing. Because of this construction, the accumulator of the present invention is adapted for remote control. The accumulating devices may be placed at a distance from the record card feeding, card sensing, and printing devices.

A set of drawings illustrates the invention and forms part of the specification.

In the drawings:

Fig. 3 is a detail view of a portion of a perforated record card.

Fig. 5 is a detail view in elevation showing the accumulator gearing and driving means. The parts are shown in position for subtraction.

Fig. 6 is a side view of the gearing and driving means shown in Fig. 5.

Fig. 7 is a section of the accumulator gearing taken along the line 7—7 in Fig. 5.

Fig. 8 is a sectional view of the accumulator gearing with the driving parts shown in position for addition.

Fig. 9 is a detail view of the switches controlled by the cams on the accumulator gears. The three switches controlled by the cam on the right hand wheel are used for the control of transferring and negative balance correction, and the two switches controlled by the cam on the left hand wheel are used in the operation of positive and negative total printing.

Fig. 10 is a side elevation view of an accumulating unit showing the arrangement of a plurality of switch plates.

Fig. 11 is a side elevation view of three accumulator units. The transfer and balance reading offset connections between the adjacent units are shown in this view.

Fig. 12 shows a set of contact plates used in the reading of a negative balance.

Fig. 17 is a detail view of a pair of contact plates used in the directing of accumulating impulses during item entering.

Fig. 18 is a detail view of a pair of switch plates adapted to carry the impulses used in the control of item printing.

Fig. 19 shows a set of switch plates provided for use in directing positive and negative total printing impulses.

Fig. 20 shows a set of adjacent switch plates used in selecting impulses for the control of printing positive or negative balances.

Figs. 21 and 21a show a wiring diagram of the machine.

Fig. 22 is a detail view of the resetting latches which are adapted to stop and hold the accumulator wheel in normal position.

Fig. 23 is a chart showing the timing of the cam contacts in the machine.

GENERAL CONSTRUCTION

Figure 4:
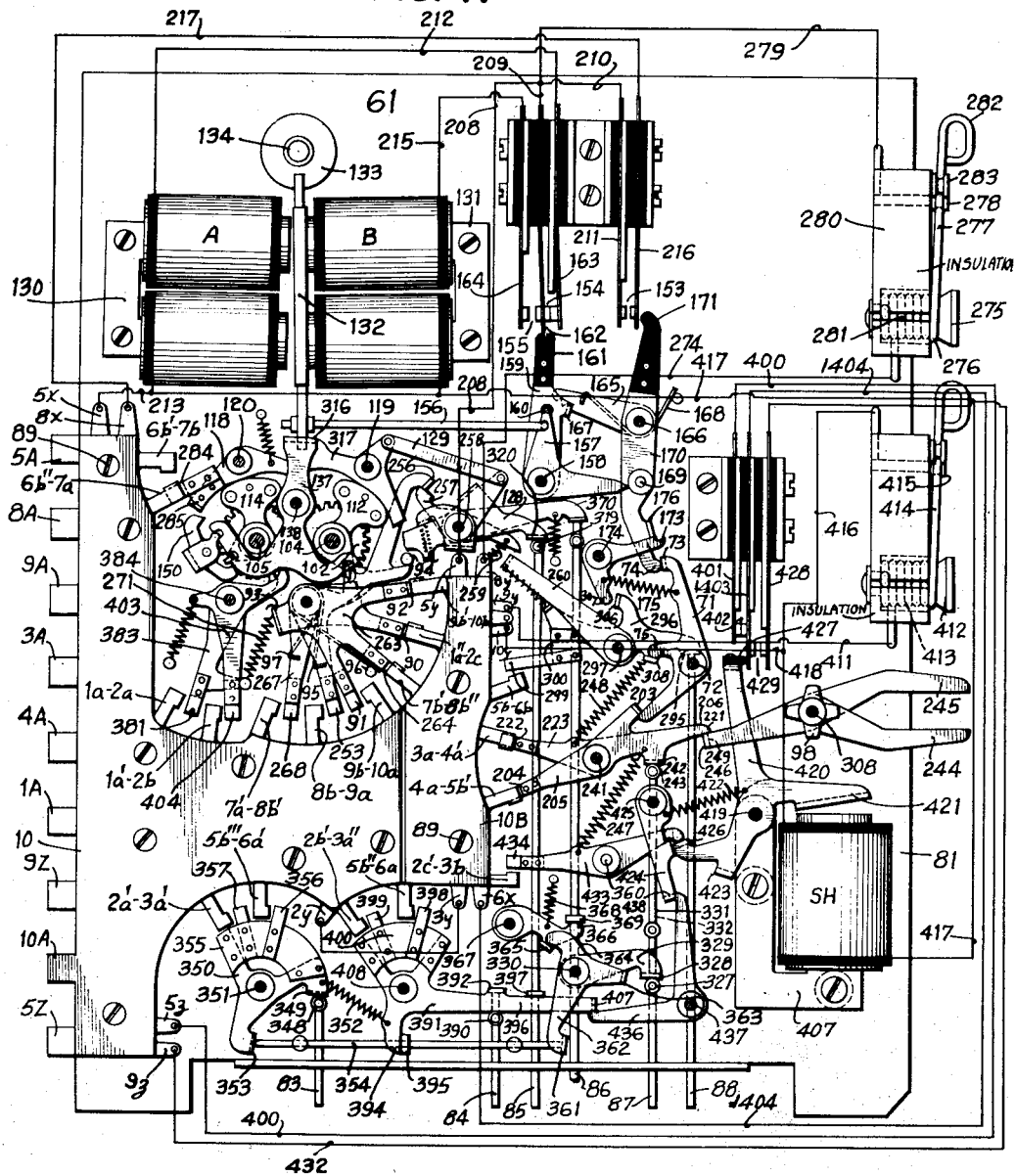
Fig. 4 is an elevation view of one of the accumulator units.

In considering the machine embodying the present invention, attention may be drawn to three main sections. The first section is the driving means comprising card feeding, card sensing, and printing and cam contact operating shafts. In general, this section of the machine is of the form shown in Patents No. 1,516,079 and No. 1,750,459 and shown diagrammatically in Figs. 21 and 21a. The second main section of the machine is the control cabinet shown in Figs. 1 and 2. This cabinet may be connected to the driving means by a cable containing a plurality of wires. The six control magnets for operating all the common automatic functions of the accumulators are assembled in this cabinet as shown in perspective in Fig. 21. The third important section of the machine is the accumulating unit, a plurality of which may be assembled in the control cabinet. A side view of one of such units is shown in Fig. 4.

Figure 1:
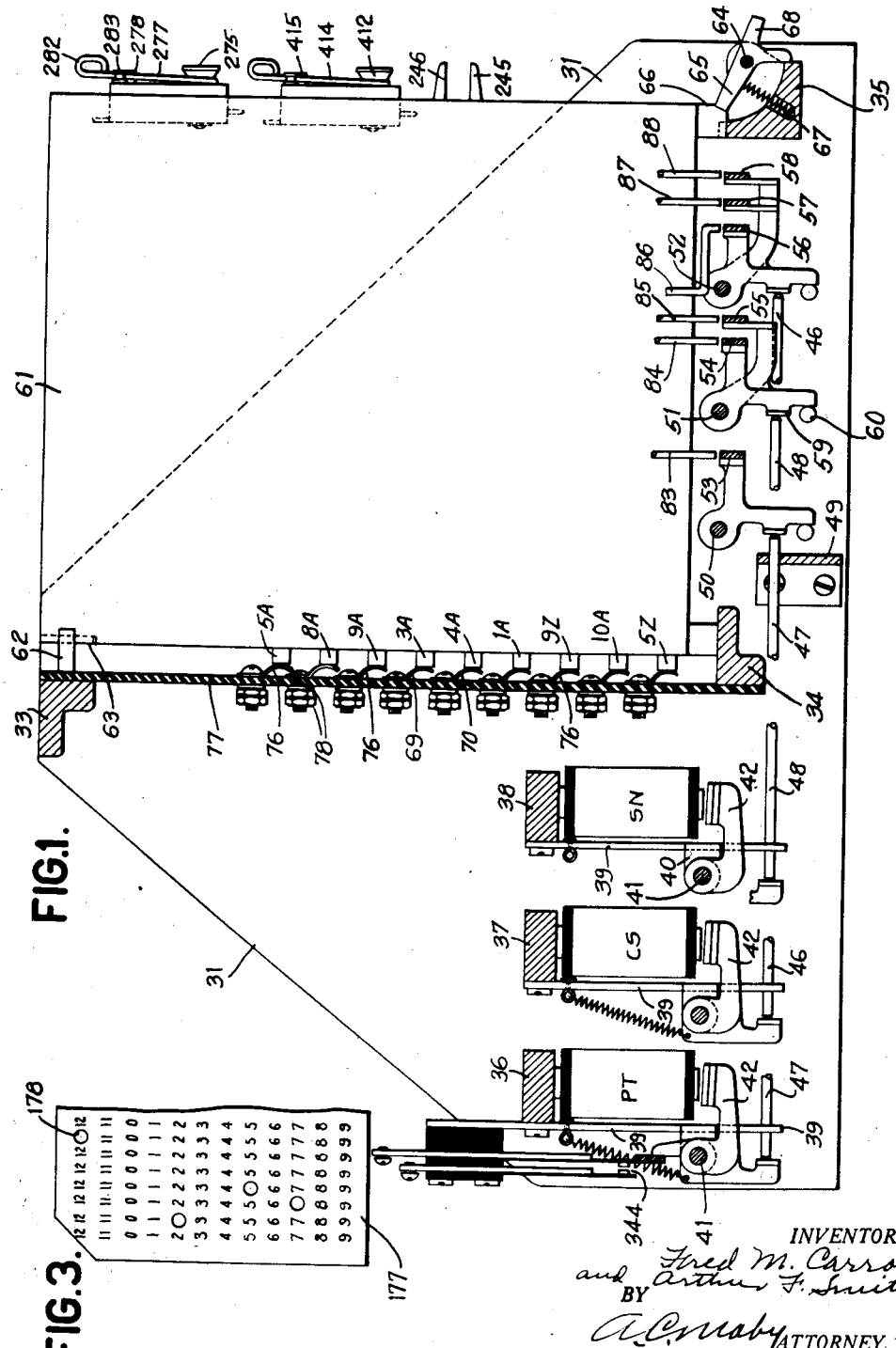
Fig. 1 is a section through the control cabinet, showing a view of the control magnets and an assembled accumulator unit.

The assembly of a unit in the cabinet is seen in Fig. 1. There it is noted that nine contact tabs extending from the left side of the unit and six stems projecting from the bottom of the unit form the only operating connections between the cabinet and the unit. Synchronism in operation between all three sections of the machine is maintained by timed impulses directed from one section to the other and occurring singly or in rapid succession.

*The driving devices*

Figure 21:
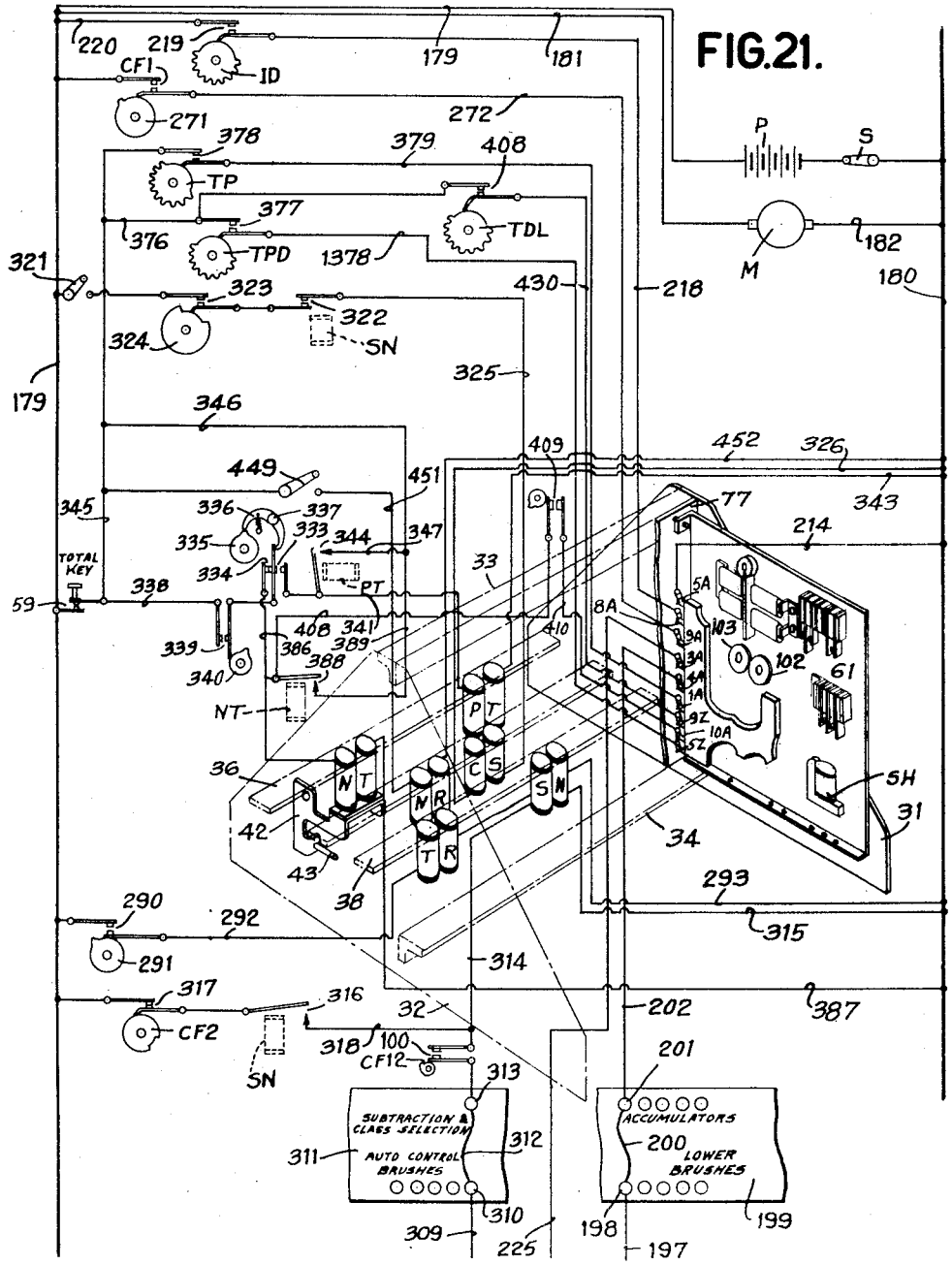

This section includes drive shafts and cam shafts connected to a motor M, Fig. 21, in the same manner that the drive shafts are connected to the motor 50 shown in Fig. 1 of the Patent 1,750,459 referred to hereinbefore. The card feed control cam contacts 194, 219, 290, CF1, 100, 317 and 323 are on a shaft geared to the card feed rollers 183, 185, 186 and 188, Fig. 21A, so that as long as cards are being fed, the cams are operated. The remaining contacts are the total contacts 377, 378, 339, 408 and 409 which may be mounted on drum shaft 231 or any other continuously running shaft connected to motor M. The time of operation of the various cams is illustrated by the chart in Fig. 23.

*The control cabinet*

Figure 2:
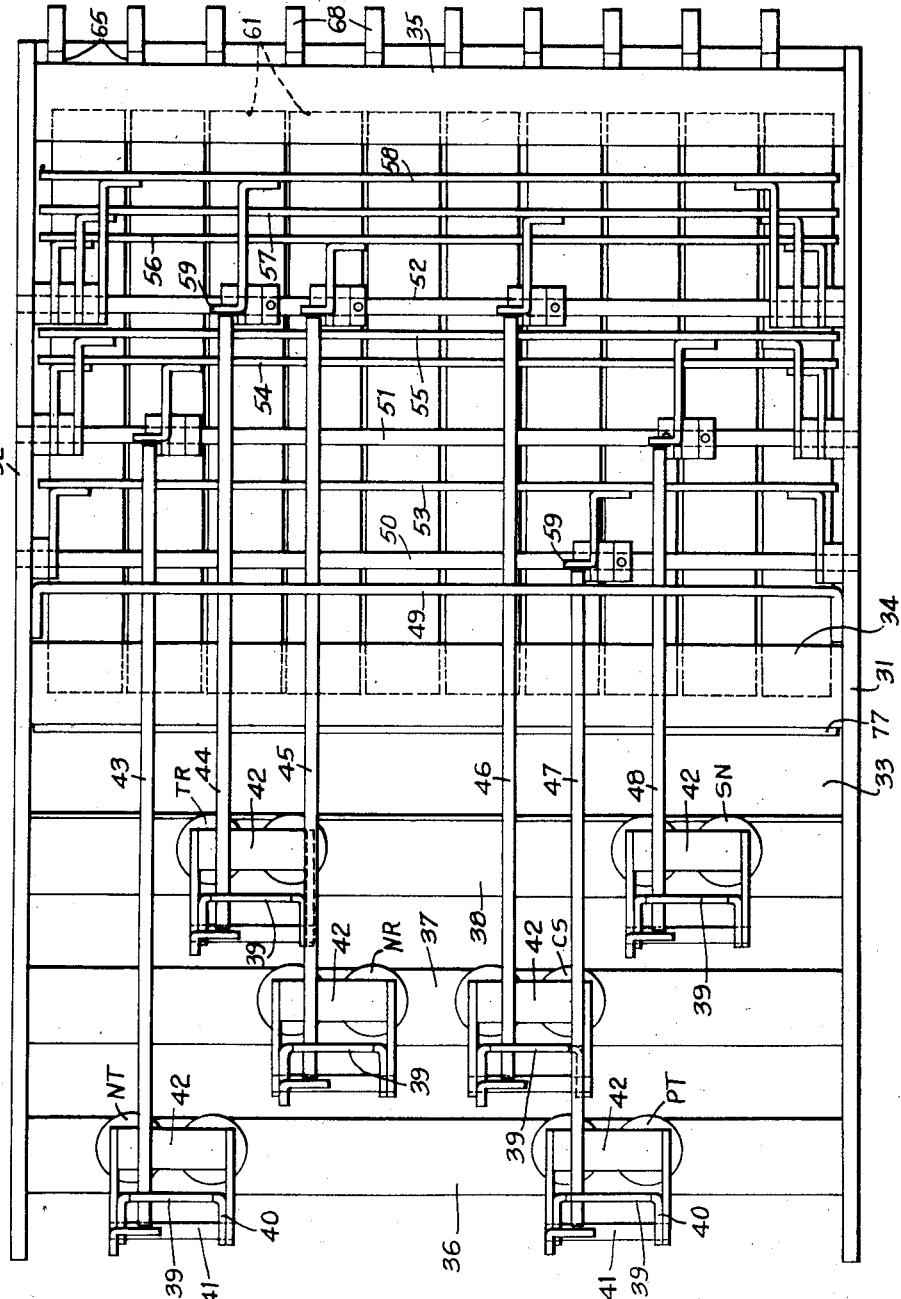
Fig. 2 is a bottom view of the control cabinet showing all of the control magnets and the connections from the magnets to the common operating bails cooperating with the assembled accumulating units.

Turning now to the construction of the control cabinet, it is noted in Figs. 1, 2, and 21 that the frame of the cabinet is made of side frames 31 and 32 and cross bars 33, 34, and 35. Between the side frames is fixed a set of three rectangular bars 36, 37, and 38 which form the framework from which the control magnets are suspended. On each rectangular bar is fastened a pair of brackets 39 formed with a pair of ears 40 carrying a rod 41. Pivoted on each rod 41 is an armature 42 in the form of a bell crank. These cranks 42 are rocked in a counterclockwise direction (Fig. 1) when a related magnet is energized. As an armature crank rocks, the lower arm thereon moves to the right (Fig. 1) and pushes before it one of a series of rods 43—48 (Fig. 2). The rods are guided by holes in the brackets 39 and holes in a common bracket 49 reaching across the cabinet and secured to the side frames 31 and 32.

Turning to Fig. 2 it is noted that a pair of magnets NT and PT are suspended from bar 36 and serve to operate rods 43 and 47, respectively. In a similar way, magnets NR and CS are suspended from bar 37 and serve to operate rods 45 and 46, respectively, and in a like manner magnets TR and SN suspended beneath bar 38 are adapted to operate either rod 44 or rod 48.

At the right end of the rods 43—48 (Fig. 1) are placed a series of control operating bails which are adapted to be operated by the rods and in turn operate connections to any one of a plurality of assembled accumulating units.

Three shafts 50, 51, and 52 are fixed in the side frames 31 and 32 of the cabinet and provide fulcrums for the arms of the control bails. The control bail 53 is pivoted on shaft 50 and adapted for operation by rod 47 under control of magnet PT. In a similar way, control bails 54 and 55 are pivoted on shaft 51 and operated by rods 43 and 48 under control of magnets NT and SN, respectively. And in a like manner, control bails 56, 57, and 58 are fulcrumed on shaft 52 and adapted for operation by rods 45, 46, and 44 under control of magnets NR, CS, and TR, respectively. As a rod moves to the right, it cooperates with a tab 59 on the side of a vertical arm of the control bail, rocking the bail in a counterclockwise direction about the fulcrum shaft and lifting the cross member of the bail. A stop stud 60 projects from a side frame on the cabinet in the path of the end of one of the side arms on the bail which abuts against the stud and acts to hold the bail in normal position.

In Fig. 1 it is noted that an accumulator unit 61 is supported between the three cross bars 33, 34, and 35 of the cabinet. The bar 33 is provided with a series of locating studs 62, one for each accumulator unit. An overturned lug 63 on each accumulator unit is formed with a perforation to coincide with the position of stud 62. As an accumulator unit 61 is slipped into the cabinet, the stud 62 for the related denominational position, guides the unit and locates it in the proper position.

At the bottom, the unit is supported on the bars 34 and 35. The bar 35 carries a shaft 64 and is slotted at intervals to guide latches 65 cooperating with projections 66 on the bottom of the accumulator units. A spring 67 holds the latch 65 in position to latch the unit frame into the cabinet. If it is desired to remove one of the units 61, a finger piece 68 on the related latch 65 is lifted to rock the latch in a counterclockwise direction out of the path of the projection 66 on the lower end of the unit. As the frame 61 of a unit is assembled, the related latch 65 automatically snaps into latching position as soon as the accumulator is moved sufficiently to the left.

When the accumulator unit is in the proper operating position in the cabinet a series of contact tabs 5A, 8A, 9A, 1A, 9Z, 10A and 5Z extending from the unit make contact with the common horizontal blades 76 of a series of terminals fixed in an insulation plate 77 mounted vertically between bar 35 and bar 34. There are seven such common terminals arranged in a vertical column on an insulation sheet 77 for each accumulator. There are two other sets of individual terminals 69 and 70 cooperating with the separate tabs 4A and 3A for receiving separate card reading impulses and sending separate print controlling impulses. Wires may be clamped between a pair of nuts provided at each terminal on the side of the plate opposite blades 69, 70, and 76.

*A representative accumulator unit*

Each accumulator unit 61 holds a complete operating and switching mechanism for one denominational order between a pair of side plates 81 and 82 (Figs. 4, 10 and 11).

The bottom of plate 81 is bent at right angles to the sides in order to form a guide and a stop for a series of switch operating stems 83—88 which protrude out of the unit. Plate 82 may be made of metal or of an insulating material if it is desired to prevent any chance electrical contact between the switches and wires of the neighboring units.

Attached to the inside of each side plate 81 by means of a series of screws 89 is a set of ten switch contact plates 1–10 (Figs. 4 and 10). Certain of these plates are formed with the contact tabs 1A, 3A, etc., mentioned hereinbefore. Other projections on adjacent pairs of these contact plates form knife switch blades which are used to direct the controlling impulses from one part of the device to another as explained more fully hereinafter. In Figs. 12 to 20, related sections and pairs of these contact plates are shown associated with cooperating accumulator parts. Some of the contact plates are in two sections in order to serve as part of more than one circuit. The contact plates are made of thin sheet metal and are arranged in a stack with each one aligned with the others but separated therefrom and from the side plates by a series of interspersed insulation bushings 99 (Fig. 10).

The adding mechanism of each accumulating unit comprises a pair of intermeshing gear wheels 102 and 103 pivoted on studs 104 and 105 projecting from the side plate 81 (Figs. 4 and 8). Each gear wheel is made with a wide bearing formed by riveting a hub 106 (Fig. 7) to the gear of the wheel. The gears are adapted for motion in either direction and when operated in adding they are driven in one direction by a pair of pawls 107 and 108 (Fig. 8) and when operated in subtraction they are turned in the other direction by another pair of pawls 109 and 110 (Fig. 5).

Pawls 107 and 109 are pivoted on studs 111 secured to a bell crank 112 (Fig. 5) pivoted on stud 104 with gear 102. In a similar way, pawls 108 and 110 are fulcrumed on studs 113 secured to a bell crank 114 pivoted on stud 105 adjacent gear 103. An oscillating movement of cranks 112 and 114 causes the pawls to turn the gears in accumulating. A coil spring 115 is provided for each pair of pawls and held on the bell crank by a shouldered pin 116. The ends of the spring 115 bear against the sides of small holes in the front ends of the pawls and urge the pawls into cooperation with the gear wheels. However, not all four pawls are permitted to engage the gear teeth of the adding wheels at one time. Either the pair of pawls 109 and 110 are held out of cooperation for an adding operation (Fig. 8) or the pawls 107 and 108 are held out for a subtracting operation (Fig. 5).

The means for selecting either the adding or subtracting pawls comprises a pair of cam members 117 and 118 pivoted on screw studs 119 and 120, respectively, on the side frame 81. The inner curve of the contour of each member constitutes a pair of cam faces which are adapted to cooperate with the tails of the pawls and thus hold the pawls out of engagement with the gear wheels as the pawls are moved back and forth in an arcuate path about the gears. The cam faces 121 and 123 formed on member 117 cooperate with pawls 107 and 109, respectively, and the cam faces 122 and 124 cut along the edge of member 118 cooperate with pawls 108 and 110, respectively. The cam members are connected for movement in unison by means of a projection 125 on member 117 cooperating with an offset lug 126 on member 118.

A spring 127 attached to member 118 tends to hold both members in a position adapting the accumulator for adding operation as shown in Fig. 8. There it is noted that cam face 123 holds pawl 109 out of operation and cam face 124 holds pawl 110 out of operation, but both adding pawls 107 and 108 are free for cooperation with the gear wheels to turn gear 102 in a clockwise direction and gear 103 in a counterclockwise direction.

When a subtracting operation is selected, a link 129 (Fig. 5) pivoted on an arm of member 117, is pushed and thereby rocks the cam member 117 in a counterclockwise direction. Cam member 118 is also rocked because of the contact between lug 126 and projection 125. Then cam face 121 holds pawl 107 out of operation and cam face 122 holds pawl 108 out of operation, while both subtracting pawls 109 and 110 are in active position to turn gear 102 in a counterclockwise direction and gear 103 in a clockwise direction. The selective operation of the subtraction control link 129 is described more fully hereinafter.

Attention may again be directed to the fact that operation of the accumulator gears is brought about by oscillating the bell cranks 112 and 114 (Fig. 5) so that the pawls carried thereon are moved back and forth in an arcuate path around the teeth of the gears. This oscillating movement is produced under control of a pair of accumulator magnets A and B (Fig. 4) adapted for rapid alternate energization.

The magnets are mounted on brackets 130 and 131 secured to the side plate 81. Between the magnets there is suspended a common armature 132. The one end of the armature is fixed to a collar 133 loosely mounted on a stud 134 fixed on the plate 81.

The other end of the armature 132 is loosely articulated in a slot 135 (Fig. 5) cut in an overturned lug 136 on a three-armed operating lever 137 pivoted on a stud 138 fixed to side plate 81. The one arm of lever 137 is formed with a recess for engaging a tab 139 on bell crank 112 and the left arm of the operating lever is cut away to engage a tab 140 on bell crank 114.

With the above mentioned connections in mind, it is plain to see that when the magnet A (Fig. 4) attracts the armature 132, operating lever 137 is rocked in a counterclockwise direction and the connected bell cranks 112 and 114 are rocked in the same direction. Then either pawl 108 (Figs. 5 and 8) or pawl 109 is effective to turn the gear wheels according to whether the operation is addition or subtraction. Immediately thereafter, the magnet B may attract the armature to rock the lever 137 in a clockwise direction. Through the connecting tabs 139 and 140, the bell cranks 112 and 114 are rocked in the same direction. When the cranks are so moved, either pawl 107 or pawl 110 is effective to turn the gear wheels for addition or subtraction.

It is obvious that two sets of pawls are provided so that each rocking movement of the lever 137 is a driving movement. In this way no useless idle motion is made in accumulating. Each vibration of the armature 132 serves to move the gear wheels 102 and 103 one tooth space in an adding, subtracting or total taking operation.

A detent 150 (Fig. 5) cooperates with the teeth on the gear 103 to prevent overthrow and to position the gear wheels at the end of each operation. The detent has two pointed ends for alternate engagement between gear teeth on gear wheel 103.

The body of the detent is in the form of a U (Fig. 6) pivoted on a stud 151 on plate 81. A projection 152 extending beyond the body of the detent is in the form of a gear tooth which protrudes into a tooth-shaped recess in operating lever 137. Thus a connection is made to rock the detent 150 in unison with the oscillation of lever 137. Toward the end of each vibration of the lever, a pointed end of the detent is inserted between two of the gear teeth on wheel 103.

A set of contacts 153, 154 and 155 (Fig. 4) control the energization of magnets A and B. Connections are provided between the armature 132 and the contacts for opening and closing the contacts under control of the magnets. A rod 156 is articulated at one end on the end of armature 132 and at the other end it is pivotally connected near the end of a vertical arm on a bell crank 157 pivoted on a stud 158. An arm 159 is also pivoted on the stud 158 next to the crank 157 and the two are connected by a tab 160 on crank 157 projecting into a hole cut in arm 159. To the top of arm 159 is affixed an insulation block 161 which is cut with a recess into which fits the end of a contact blade 162. This blade is the actuating member between a pair of blades 163 and 164 carrying contacts 154 and 155. Through the aforementioned connections between armature 132 and center blade 162, the contacts 154, 155 are alternately closed and opened when the accumulator is operated. As the armature 132 moves towards magnet A, the contacts 155 are closed to adapt magnet B for energization, and then, as the armature moves toward magnet B, the contacts 154 are closed to adapt magnet A for energization. In this way, armature 132 is adapted for rapid vibration, the initiation of which is explained more fully hereinafter.

A means is provided to align and retain arm 159 in each of the two adjusted contact closing positions. A detent arm 165 is pivoted on a stud 166 and cut with a pair of V-shaped grooves cooperating with the upper edge of an offset lug 167 on arm 159. A coil spring 168 wrapped around stud 166, bears down on arm 165 and tends to retain and align lug 167 in either of the grooves in the arm.

On the initial operation of armature 132 in either direction, a pair of contacts 153 are closed and held closed for the remainder of the operation. For this purpose the end of the horizontal arm of bell crank 157 is formed with a point cooperating with a roller 169 on a lever 170 pivoted on stud 166 and carrying an insulation finger 171 adapted to close contacts 153. A slight movement of bell crank 157 in either direction is sufficient to displace roller 169 and rock lever 170 in a counterclockwise direction to close contacts 153. The inherent spring action in blade 216 tends to hold lever 170 in place and bring it in a contact opening position. However, once the lever is operated to close the contacts 153, it is latched in operated position by a latch 173 pivoted at 174. The latch is drawn into latching position by a spring 175 attached thereto. A shoulder on the latch cooperates with an offset 176 on the lever to hold the same in position. When contacts 153 are closed, the magnets A and B are connected to the source of operating energy which is then supplied in a manner explained more fully hereinafter.

The controlling record

In Fig. 3 there is shown a portion of a perforated record card 177 of the kind used to control the machine. At the left of the card it is noted that certain of the index points are punched out to represent the amount 275.

The hole 178 punched at the top of the card is a special perforation which may be used in either of two ways. It may denote a debit amount and control the machine for subtraction, or it may mark the card as being one carrying a classified amount and control the machine in class selection to avoid adding said classified amount.

The electrical operating connections

Referring now to the wiring diagram in Fig. 21, it is noted that closure of the switch S connects the power source P across the main lines 179 and 180 and energizes any other completed circuit including these lines. The driving motor M is energized through the wires 181 and 182. This motor operates the card feeding devices through the usual clutch connections and serves to drive the printer shaft and the shafts carrying the many cams and impulse timers mentioned hereinafter.

The cards 177 are picked out of the magazine and fed one at a time through feed rollers 183 (Fig. 21A) past the upper card lever UCL, between the upper brushes UB and contact bar 184, through rollers 185 and 186, past the lower card lever LCL, then between the lower brushes LB and contact bar 187, and finally drawn down by rollers 188 and fed into a stacker.

The lower brushes LB are mounted in a movable holder in the form of a lever 189 pivoted at 190 and cooperating with a cam 191 fastened to shaft 192. A spring 193 draws the lever into cooperation with the cam. The contour of the cam is designed to hold the brushes LB in cooperation with the card only during the time that the amount index points 9—0 are passing thereunder.

As the cards pass the sensing stations, they rock the card levers UCL and LCL to close the contacts LCL1 and UCL1, conditioning part of the card sensing circuit.

*Accumulator operation*

The path that the timed impulses follow in an item entering operation may be traced on the wiring diagram shown in Figs. 21 and 21a. The accumulator operating circuit may be followed from line 179 (Fig. 21a) through contacts LCL1, contacts 194 (the closure of which is timed by cam projections on an impulse timer IT), then through wire 195, wire 196, contact bar 187, then through a perforation in the card presented at a differential instant, lower brushes LB, wire 197 (Fig. 21), to a socket 198 in a plugboard 199. Plug wire 200 is connected selectively to one of the sockets 201 in plugboard 199. The circuit continues through socket 201 and wire 202 to terminal tab 4A on contact plate 4 (Fig. 17). The impulse continues through the plate 4 to an extending knife switch blade 4a, thence through a contact blade 204 on a controlling lever 205 and across the knife switch into another blade 5b' on the plate 5B where the circuit includes a wiring terminal 5y. To the terminal 5y (Fig. 4) is connected a wire 208 leading up to a series connection through wires 209 and 210 connected to contact blades 162 and 211, respectively. These blades lead the circuit through the contacts 153, 154, and 155, mentioned hereinbefore. The course that the circuit then takes depends on which of the contacts 154 or 155 is closed. As shown in Fig. 4, with contact 154 closed, the circuit continues through contact blade 163, wire 212, magnet A, wire 213, terminal 5x, contact tab 5A (Figs. 17 and 21), and through wire 214 to the other side of the line 180, completing the circuit.

Should the contacts 155 be closed (Fig. 4) the circuit takes the course through contact blade 164, wire 215, magnet B, wire 213, terminal 5x, contact tab 5A, and through wire 214 to the other side of the line. In either case, the armature 132 is vibrated and the contacts 153 are closed, setting up a series circuit through wire 210. This series circuit continues from wire 210 and contact blade 211 through contacts 153, blade 216, wire 217, terminal 8x, contact tab 8A (Fig. 21), wire 218, contacts 219 closed by impulse distributor ID, and then through wire 220 to line 179.

From the connections outlined above it may be gathered that the differentially timed impulse initiated by the perforation in the card serves to energize either one of the magnets A or B. At the same time the contacts 153 are closed so that further energization of the magnets may take place under control of the closing of contacts 219. In other words, the perforation in the card initiates the sending of accumulating impulses and the impulse distributor ID continues the sending of impulses through the adding magnets.

The number of impulses directed through the magnets depends on the time that the first impulse is initiated under control of the card. This is arranged by revolving the impulse distributor ID in synchronism with the feeding of record cards so that the closure of contacts 219 occurs during the sensing of each index point upon the card. During each card sensing operation, after the perforation on the card passes the related lower brush, the circuit through the adding magnets A and B is cut off at the card and energization of the magnets is continued through contacts 153 and 219.

The circuit may be traced from line 180 (Fig. 21), wire 214, contact 5A, terminal 5x (Fig. 4), wire 213, magnets A or B, wire 212 or wire 215, contacts 154 or 155, center blade 162, wire 209, wire 210, blade 211, contacts 153, blade 216, wire 217, terminal 8x, contact 8A (Fig. 21), wire 218, contacts 219 and wire 220 to line 179. As the differential number of timed impulses are directed through the magnets, the armature 132 vibrates a corresponding number of times and turns the accumulator wheels 102, 103 a related number of steps by means of the mechanism described in connection with Figs. 5 and 8.

*Printer operation*

At the same time that an impulse is directed to control the amount entering operation of the machine, an impulse is also directed to control the printing of a record of such an amount. The printing circuit may be followed from line 179 (Fig. 21A), contacts LCL1, contacts 194, wire 195, wire 196, contact bar 187, brush LB, wire 197 (Fig. 21), plug wire 200, wire 202, contact tab 4A on plate 4 (Fig. 18). The circuit continues through the plate 4 to a knife switch blade 4a' projecting therefrom across a switch blade 222 mounted on a non-print lever 223, thence through another blade 3a on plate 3 provided with contact tab 3A. From the tab 3A the circuit continues through wire 225 (Fig. 21), socket 226 (Fig. 21A) in a plugboard 227. A plug wire 228 connects the circuit to one of a plurality of sockets 229 attached to a wire 230 leading through the print magnet P to the other side of the line 180. In this way the printer magnet P is energized at a differential instant in the operating cycle. The printing mechanism is similar to the devices set forth in my copending application Serial No. 648,039, filed December 20, 1932, eventuating in Patent 1,981,990.

At the same time that the card is fed under the lower brushes, a printer drive shaft 231 rotates in synchronism therewith and carries a frame 232 provided with a series of type members 233 arranged around the outer edge of the frame and carried in proximity to the platen 234 carrying a record sheet 235. When the printer magnet P is energized it attracts an armature 236 having connections to a latch 237 which then operates to release a type bar tripping catch 238. The catch cooperates with an operating pawl 239 pivoted at 240 with the type member 233. The release of the catch 238 is thus timed to pick out a particular type member. The clockwise rotation of the operating pawl 239 carries along the type member 233 causing it to strike the record sheet 235 leaving an imprint of the number thereon. The details of the printer construction may be noted by reference to the patents referred to hereinbefore.

*Nonadd and nonprint operation*

The levers 205 (Fig. 17) and 223 (Fig. 18) previously referred to, may be operated by hand to eliminate either adding or printing. Reference to Figs. 4 and 11 shows that both levers are pivoted on a common stud 261 and carry forwardly extending projections 206 and 221 cooperating with hand levers 244 and 245, respectively. Both hand operated levers are pivoted on a stud 308 in frame 81. Cup washers 98 hold the levers in position on stud 308. Lever 244 is formed with an overturned lug 246 cooperating with the projection 206 on the non-add lever 205. When this lever 244 is depressed, the switch lever 205 is rocked counterclockwise against the tension of spring 247 and the contact blade 204 is withdrawn from the position between knife switch blades 4a—5b'. Thus the accumulator circuit is interrupted at this point under control of the operator.

In a similar way, the depression of lever 245 and contact between tab 249 thereon with the underside of projection 221 causes the counterclockwise rocking of switch lever 223 against the tension of the spring 248, withdrawing the blade 222 (Fig. 18) from a contact making position between knife switch blades 3a—4a'. The operation of switch lever 223 interrupts the printing circuit and causes a non-print operation at the will of the operator.

Another means for operating switch lever 205 is provided in the form of a bell crank 71 operated by lever 170. The bell crank 71 is pivoted on stud 72 and formed with a tab 73 in the path of an extension 74 on lever 170. When the lever is swung in a counterclockwise direction by crank 157 on the initiation of impulse sending operation, the crank 71 is rocked clockwise and the lower arm thereon presses against an offset 203 on switch lever 205 to rock the blade 204 out of contact making position. Thus, impulses are prevented from coming through the card sensing devices once the contacts 153 are closed for automatic impulse delivery.

*Transferring operation*

As the accumulator wheels are operated in adding or subtracting, when a wheel passes from 9 to 0 or 0 to 9 it is required that a transferring operation take place to transfer a unit to or borrow a unit from the higher order. Should a higher order wheel be standing at 9 or 0 when such a transferring or borrowing operation takes place, the accumulator should be adapted to carry the transferring operation over into a still higher order. The devices of the present invention are provided with means for transferring under the three conditions mentioned; namely, when a wheel passes through a transfer point or when it stands at 0 or 9 in readiness to carry the transfer to or from a still higher order.

In Fig. 9 is shown the mechanism cooperating with the accumulator wheels for the purpose of transferring. The hub 160 on the accumulator wheel 102 is provided with a pair of cam extensions 250. When the wheel is turned so the projection 250 passes from the 9 to 0 position or vice versa, it operates a lever 251 pivoted on stud 252. This lever carries a switch blade 253 adapted to make contact between knife switch blades 9b and 9a. A stop stud 94 limits the counterclockwise movement of the lever as urged by spring 95. At its upper end the lever carries a projection 256 cooperating with a latch 257 designed to hold the lever in operated position when once operated during an accumulating cycle. It is latched so that a transferring impulse may be directed through switch blade 253 at a time shortly after the period during which the regular amount impulses cause rotation of the accumulator wheels and tripping of the transfer levers. The latch 257 (Fig. 4) is pivoted on a stud 258 and a spring 259 attached thereto keeps the latch in cooperation with the extension 256 on lever 251. After the transferring impulse is directed under control of the switch lever 251, the latch 257 is rocked in a counterclockwise direction by lever 260. This lever operates in order that the transferring devices may be released to assume a normal position in condition for a new cycle of operations and is described more fully hereinafter.

Again turning to the showing in Fig. 9 it is noted that when the accumulator wheel 102 stands in the zero position, the cam projection 250 thereon cooperates with the point of extension on the rear arm 263' of the lever 263 pivoted on stud 252. A stop stud 96 limits the movement of the lever when operated by spring 271.

The end of this lever is provided with a switch blade 264 adapted to close a circuit between a pair of knife switch blades 7b'—8b'' when the related accumulator wheels are positioned at zero as shown. This lever is in the form of a bail having three arms (see Fig. 12) ending in contacts 264, 91 and 92 on one side and contact 90 on the other side arm, the two sides being connected by a cross bar 93. In a similar way, when a wheel is at the 9 position it cooperates with a lever 267 also pivoted on stud 252. This lever 267 has a contact blade 268 adapted to fit between a pair of switch blades 7a'—8b'. Stud 94 stops lever 267 when it is moved by spring 97. Springs 271, 95 and 97 hold the transfer switch levers into cooperation with the transfer cam 250. The various transfer circuits may now be traced through the contacts made as described in connection with the mechanism in Fig. 9.

At a point in the amount entering cycle after the direction of a number of impulses for adding the amount, another impulse is directed into the accumulator by the operation of a cam 271 (Fig. 21) in closing contacts CF1. The circuit through these contacts may be traced from line 179, through contacts CF1, wire 272, contact tab 9A (Fig. 13), contact plate 9, knife switch blade 9a, extending from plate 9, contact blade 253 which is moved when the wheel passes through the transfer point, the other knife switch blade 8b on plate 8B, through the plate to terminal 8y (Fig. 4), then through wire 274 (Fig. 4), a stud 275, a spring 276, wound around the stud, a stem 277 extending from spring 276 to a stud 278 in the next higher order, then through wire 279 and wire 209 attached to the center blade 162. From this point on, the course of the circuit is determined by the closed or open condition of the contacts 154 and 155.

The circuit continues through wire 212 or wire 215, magnet A or magnet B and wire 213 to terminal 5x and thence through tab 5A (Fig. 21) and wire 214 to the other side of the line 180.

The transmission of this single impulse results in a single vibration of the armature 132 and the actuation of the accumulator wheels for one step in either direction according to the nature of the operation.

In Figs. 4 and 11 it is noted that the stud 275, spring 276 and stud 278 for each order are mounted in an insulation block 280 occupying the space between the plates 81 and 82 of an accumulator unit. The one end of the spring 276 is threaded through a slot 281 (Fig. 4) in the side of the block 280. This serves to hold the one end of the spring in position while the other end terminating in stem 277 is free to be manipulated by grasping the finger piece 282 at the upper end.

If the stem is grasped and moved to the right (Fig. 11) it may be latched behind a shoulder on a stud 283 fixed in the same block 280 carrying the spring 276. In this way, a split may be effected in the accumulator between any of the adjacent units, each of which constitutes a denominational order. In this way, the transferring impulses from a lower to a higher order are interrupted so that a higher order may be used as the units order of a group of units. Such split is shown between the first and second orders of the units shown in Fig. 11. The position of the stem 277 between the second and third orders of this same view show the second order coupled to the third order for the transference of carrying impulses.

The contacts closed at 9 or 0, as shown in Fig. 9, also enter into the transmission of transferring impulses from lower to higher orders, however, these impulses are initiated selectively according to the condition of the accumulator for addition or subtraction. In other words, when the accumulator is conditioned for addition and a wheel stands at 9, it is adapted to transfer units from a lower to a higher order while nothing takes place when the same wheel stands at zero. On the other hand, with the accumulator conditioned for subtraction with a wheel standing at 0, the unit is conditioned to borrow or subtract a unit from a higher order while at the same time the contacts made by positioning a wheel at 9 are ineffective.

Other devices are operated simultaneously with the initiation of transferring impulses for the purpose of restoring the devices set up for accumulating and establishing contacts for the conduction of impulses over paths usually occupied by impulses used in amount entering.

Figure 15:
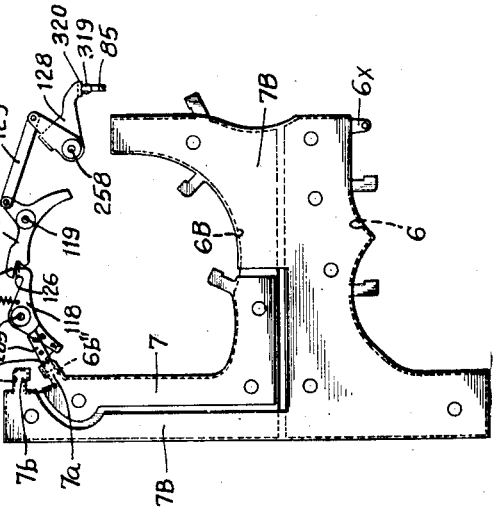
Fig. 15 is a detail view of the related set of switch plates used in the control of negative and positive transferring.

The adding or subtracting condition of the machine in its influence on transferring is indicated by the position of the contact blade 284 (Figs. 4 and 15) mounted on an insulation sector 285 fastened to the member 118 pivoted at 120. It is noted hereinbefore in connection with the discussion of Figs. 5 and 8 that member 118 is rocked in a clockwise direction when subtraction is to be effected. In Fig. 15 the member is shown in the position for addition where the blade 284 establishes contact between the blades 6b'' and 7a of a knife switch formed by extensions on contact plates 6B and 7. If the member 118 is rocked to its subtraction position, the same contact blade 284 establishes a circuit between the blades 6b' and 7b formed by extensions on plates 6B and 7B.

Thus a selection is made between the plates 7 and 7B which carry the other separated blades 7a' and 7b' referred to in describing the mechanism shown in Fig. 9. The switch including blade 284 forms a means for selecting the coupling connection between accumulator orders with the wheels standing at 9 or 0.

Various other devices and contacts must be operated before the accumulator units are conditioned for the transmission of transferring impulses. The operation of these devices is controlled by the transfer and restore magnet TR shown in Figs. 2 and 21. The operation of the magnet is brought about by the closure of a pair of contacts 290 (Fig. 21) by a cam 291 timed to operate at the same time as the cam 271. The circuit through magnet TR may be traced from line 179 through contacts 290, wire 292, magnet TR and wire 293 connected to the other line 180. When this magnet is operated it positions the rod 44 (Fig. 2) operating the bail 58 and lifting the stem 88 (Fig. 4). At its upper end the stem is guided by a stud 72 and abuts against an overturned tab 295 on a lever 296 pivoted at 297. A spring 248 tends to rock the lever 296 in a clockwise direction to bring the tab 295 at rest on the stud 72. However, when the stem 88 is lifted the lever 296 is rocked in a counterclockwise direction and a contact blade 299 attached to insulation sector 300 mounted on the lever is drawn down into contact making position (Fig. 16) between a pair of extending blades 5b and 6b. These blades are formed as extensions on plates 5B and 6B forming part of the connections between higher and lower orders for the transfer.

The lever 296 also operates to restore any carrying levers 251 previously locked in carrying position during the amount entering portion of the adding cycle. For this purpose the lever is formed with a projection 303 (Fig. 16) cooperating with the middle of the restoring member 260 pivoted on stud 297 and formed with an overturned edge 261 which abuts against the lower side of the end of latch 257. A spring 305 usually holds the restoring member 260 against projection 303. When lever 296 is restored, the member 260 is separated from projection 303 by inertia and latch 257 is struck and rocked in a counterclockwise direction to release lever 251. Lever 296 is drawn in a clockwise direction by spring 248 and then suddenly stopped, but member 260 continues to move a short distance, momentarily separating from projection 303 far enough for edge 261 to strike latch 257.

The lever 296 performs another function in opening contacts 153 to prepare the amount entering devices for operation on a subsequent cycle. This is brought about by means of an extension 306 on lever 296 in cooperation with an end 307 formed on one arm of the lever 173 mentioned hereinbefore. Spring 175 normally tends to hold the latch lever 173 rocked in a counterclockwise direction to support extension 176; however, movement of stem 88 is transmitted through extension 306 and the lever 173 is rocked in a clockwise direction to release the contact closing lever 170 so that the contacts 153 are opened and remain open after the transfer operation. The cam 291 holds contacts 290 closed until contacts CF1 open, therefore magnet TR holds up rod 88 long enough to rock latch 173 out of latching position while lever 170 is oscillated as a transfer impulse goes through magnet A or magnet B.

The stem 88 in its operation performs another function by operating the non-add lever 205 to prevent the passage of any but transferring impulses through the plates 4 and 5B during transferring. This is brought about by means of an offset 308 on lever 296 cooperating with a short arm 75 extending from lever 71. When lever 206 is turned by stem 86, lever 71 is rocked in a clockwise direction and swings up the lower arm abutting against projection 203 on switch lever 205. Thus the lever 205 is rocked in a counterclockwise direction withdrawing blade 204 from contact making position between blades 4a and 5b'.

Now that the operations preliminary to the coupling of the various orders for transferring have been explained, the actual path of the transferring impulses may be traced on the wiring diagram. When an accumulator wheel stands at 0 or 9 in readiness for the transmission of an impulse for adding or subtracting a unit in a higher order, it is necessary for the functioning of the devices that the impulse should come from a still lower order which is actuated by actual transferring. Such an impulse comes over the wire 279 (Fig. 4) where it is directed down through wire 209 into center blade 162. At the same time the impulse may be carried in series over the wire 208 which at the time is not used for transmitting impulses from the lower brushes to the center blade 162. From the wire 208 the circuit may be followed down through terminal 5y (Fig. 16) through plate 5B, blade 5b, center blade 299, the other blade 6b on plate 6B which carries the complemental pair of switch blades 6b. From this point on, the impulse may be directed over one of two different paths. If the machine is conditioned for addition, the path taken will be over the connection shown in Fig. 15 where blade 6b'' is connected with blade 7a by contact blade 284, then plate 7 acts as a conductor in directing the impulse along to contact blade 7a' (Fig. 9) which forms one of a pair of knife switch blades 7a'—8b' closed when lever 267 is operated by a wheel standing at 9 to insert the contact blade 268 therein. Blade 8b' forms part of a plate 8B carried adjacent a plate 7B.

It is this plate 8B (Fig. 14) which carries the terminal 8y, and the impulse carried through switch blade 268 travels around the plate to the terminal 8y (Fig. 4), through wire 274 to stud 275, through transfer stem 277 to the stud 278 in the next higher order accumulator unit, and thence along wire 279 to a connection with wire 209 leading to the center blade 262 from which point the impulse travels through either one of the operating magnets A or B and over to the other side of the line 180 in a manner described hereinbefore. At the same time that the impulse travels from wire 279 down through wire 209, it may also branch off into another series circuit through wire 208 leading to the next higher order. By means of such connections, it is possible, where a plurality of wheels stand at 9 and the lower order wheel receives a transfer, to carry the transfer through all of the units and over into the order higher than the highest order with a wheel at 9.

*Subtracting operation*

Figure 14:
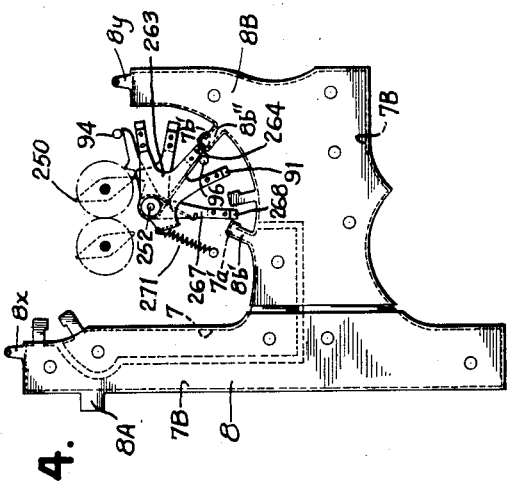
Fig. 14 is a detail view of an adjacent set of switch plates also used in the control of transferring.

The circuit described above is concerned with operation of transferring under conditions assumed when the unit is adapted for operation in addition. Now it may be considered that the devices are adjusted for subtraction. The coupling circuit between the orders is the same for subtraction as it is for addition up to a certain point. The impulse travels down through terminal 5y (Fig. 16), switch blade 5b, contact blade 299, blade 6b, and plate 6B up to the switch blade 284 (Fig. 15) in the same way as during addition. At this point, the selection of the mode of transferring is changed by the adjustment of the blade 284 on the switch lever 116. This lever is rocked in a clockwise direction and the blade 284 is inserted between switch blades 6b' and 7b. In this way an impulse travelling through plate 6B is directed over into plate 7B formed with a switch blade 7b' (Fig. 14).

This blade forms one of a pair of knife switch blades 7b'—8b'' cooperating with a blade 264 on the lever 263 operated by the cam 250 when the related wheel stands at the zero position. With the lever operated and rocked in a clockwise direction, the blade 264 closes connections between plates 7B and 8B, directing the subtracting transfer impulse up to terminal 8y. From there the impulse travels along wire 274 (Fig. 4) up to the stud 275, through stem 277, stud 278 of the next higher order, wire 279, wire 209, single contact blade 162, and thence through either contact 154 or 155 and magnet A or magnet B and also to the other side of the line. Since at this time the members 117 and 116 (Fig. 5) are shifted to a subtraction selection position, the operation of the armature 132 will cause the pawls 119 and 109 to turn the accumulator wheels in a direction which is the reverse of addition, thus borrowing or subtracting a unit from the wheel in the order higher than the wheel standing at zero. If a plurality of wheels stand at zero when a borrowing operation is permitted on the lower order wheel at zero, the borrowing impulse is carried along from unit to unit over the wires 208 (Fig. 4) so that all such wheels are turned back to 9 and the number on the still higher order wheel is reduced by one.

An amount which is to be subtracted is identified by being placed on a record card containing the special perforation 178 (Fig. 3). It is this special perforation which controls the adjustment of various devices of the machine for the operation of the accumulators in subtraction. As shown, when a card passes under the upper brushes, a circuit is set up through the brush cooperating with the column of index points on the card containing the perforation 178.

Such a subtraction control circuit may be traced from line 179 (Fig. 21A) through contacts LCL1, contacts 194, wire 195, contacts UCL1, closed as the card passes under the upper brushes, contact block 194, brush UB, wire 309, plug socket 310 on a plugboard 311 and thence through a plug wire 312 connected to a socket 313, contacts 100 closed at the instant the special index point passes the brush, wire 314, through subtraction magnet SN and through wire 315 to the line 180. A holding circuit is established through magnet SN by the closing of associated contacts 316 (Fig. 21) in line with a circuit including line 179, contacts 317 (closed by cam CF2 through a subsequent cycle up to the point shortly before sensing another special perforation), contacts 316, wire 318, wire 314, magnet SN and wire 315 to line 180. Over these circuits, magnet SN is energized and held energized for a subtraction cycle.

Referring to Figs. 1 and 2, it is seen that the energized magnet SN operates to position the rod 46 and swing the bail 55 to lift stem 85 (Fig. 4). This stem is guided near its upper end by a stud 319 upon which rests an offset portion 320 formed as part of a bail 128 formed with an arm articulated to the link 129, mentioned hereinbefore. As the stem 85 is lifted, it rocks the bail 128 in a counterclockwise direction (Fig. 15) rocking the subtraction members 117 and 118 to adjust the accumulator operating pawls for subtraction and shifting the contact blade 284 for the control of transferring during subtraction.

The print controlling circuits for the items entered during subtraction are the same as those used in the control of printing during addition. The impulses travel over the same path through the lower brushes, the non-print switch lever 223, the plugboard 227 and the print controlling magnets P.

*Class selection operation*

The special perforation 178 (Fig. 3) may be used in a way other than for subtraction control. The appearance of such a perforation in a record may serve as a means for controlling the machine to prevent accumulation and printing of the amount associated therewith. Such operation is known as class selection control where it is desired to eliminate the consideration of certain classes of items in the compiling of a record. When such control is desired, the switch 321 (Fig. 21) is closed to direct a circuit through the class selection magnet CS whenever a special perforation is sensed in a record. The magnet SN mentioned hereinbefore enters into the class selection control by operation in the same manner as when performing a subtracting operation as set forth hereinbefore. The energization of magnet SN is caused by the sensing of a special perforation under the upper brushes in the manner already noted. As the magnet SN closes contacts 316 to form a holding circuit, it also closes contacts 322 to initiate a class selection control circuit. This circuit may be followed from line 179 (Fig. 21) through switch 321, contacts 323 (closed by cam 324 during the greater part of each cycle), contacts 322, wire 325, magnet CS and wire 326 to the line 180. Turning to Figs. 1 and 2 it is noted that the energized magnet CS operates to position the rod 46 and lift the bail 57 cooperating with the stem 87, Fig. 4. This stem is guided at its upper end by a stud 327 upon which rests an offset lug 328 formed as part of an arm 329 pivoted on a stud 330. In Fig. 11 it is noted that this lug 328 is long enough to underlie a pair of rods 331 and 332 which cooperate with the shoulders 242 and 243 respectively on the non-add and non-print levers.

In this way, as soon as stem 87 is raised under control of the class selection magnet CS the rods 331 and 332 are lifted to rock the levers 205 and 223 in a counterclockwise direction (Fig. 4) withdrawing the blades 204 and 222 from a switch closing position to an open position whereupon the adding and printing circuits are disconnected to avoid making a record of the amount associated with the special perforation.

*Balance determination*

The machine is adapted to print a true amount representing the positive or negative total. This total is produced by operating the accumulator wheels in one direction or another and closing contacts in line with the printing magnets as the wheels reach a total reading position. The initiation of a total taking operation is caused by the closing of contacts 59 (Fig. 21) under control of the total key or a total timer adjusted by the usual automatic group control system. In line with these contacts 59 are a pair of contacts 333 and 334, either one of which is closed according to the amount reading of a cam 335 mounted on the highest order accumulator wheel. If the wheel stands at 9, as shown in Fig. 21, this is an indication that the accumulator holds a negative balance and the contacts 334 are closed by a lever 336 pivoted at 337 and cooperating with the cam projection on the highest order wheel. However, should the wheel stand at any position other than 9, it is an indication that the accumulator holds a positive balance and the lever 336 is free to permit the closing of contacts 333 for the reading of a positive total.

*Positive total print operation*

Assuming that the accumulator holds a positive total and is otherwise conditioned for total reading operation, a circuit may be traced through the positive total taking magnet PT. The circuit runs from line 179 through contacts 59, wire 338, contacts 339 closed by cam 340, contacts 333, wire 341, magnet PT and wire 343 to the line 180. The magnet closes a pair of contacts 344 associated therewith for the purpose of establishing a holding circuit. The holding circuit includes contacts 59, wire 345, wire 346, wire 347, contacts 344, wire 341, magnet PT and wire 343 to line 180. The energized magnet PT operates to shove rod 47 (Figs. 1 and 2) lifting bail 53 cooperating with stem 83 (Fig. 4). The top of stem 83 is guided by a stud 348 upon which rests an offset lug 349 forming part of a lever 350 pivoted at 351 on frame plate 81. A spring 352 attached to lever 350 urges it in a clockwise direction to place lug 349 against stud 348. The lever is formed with another offset lug 353 cooperating with a horizontal rod 354. An insulation sector 355 attached to the lever carries a pair of contact switch blades 356 and 357. These blades cooperate with switch formations shown in Figs. 16 and 19. As the stem 83 is raised under control of the positive total magnet PT, the lever 350 is rocked in a counterclockwise direction closing the pair of switches and shoving rod 354 to the right.

The operation of rod 354 serves to condition a few devices in preparation for the reading of a total. The usual adding and printing connections are disabled and a means is made effective to stop the accumulator wheels when they reach normal position. In the performance of these functions, the rod 354 at the right end cooperates with an offset portion 361 formed as part of a three-armed lever 362 pivoted on stud 330 adjacent the arm 329.

One arm of the lever 362 is formed with a projection 363 underlying the arm 329 and adapted to raise the arm when the rod 354 is shifted to the right. In so raising the arm the pair of rods 331, 332 (Figs. 4 and 11) are raised to operate the non-add lever 205 and the non-print lever 223. In this way, the contact blades 204 and 222 are withdrawn from circuit closing positions to disable the normal adding and printing circuits.

The third arm 364 on lever 362 cooperates with a shoulder 365 formed on an arm 366 pivoted at 367 on the accumulator frame. A spring 368 attached to arm 366 tends to hold the arm in cooperation with lever 362 and at the same time uphold the stem 86 through a collar 369 attached to the stem and resting on top of the arm 366. As the arm 366 is rocked in a clockwise direction under the urging of arm 364 when lever 362 is operated, the stem 86 is allowed to lower under pressure exerted by a bail 370 formed with a projection overlying the top of the stem. This bail 370 (Fig. 22) is pivoted on stud 258 and forms part of the devices used for holding the accumulator wheels in normal position when they reach such position during operation in total taking. The bail 370 is formed with a cross bar 101 and a shoulder 371 overlying a pair of arms 372 and 373 also pivoted on stud 258. A pair of springs 374 attached to the arms tend to raise them into a position for obstructing movement of the accumulator wheel by cooperating with one of a pair of pins 375 attached to the accumulator gear wheel 102. The end of arm 372 is formed with an abrupt face running parallel with and opposite to a similar face formed on a curved offset portion of arm 373.

Between the faces of both arms, the pin 375 may be confined to hold the accumulator wheels in a normal zero position. However, in normal adding and subtracting operation both arms are held out of obstructing position by bail 370 held up by stem 86 and spring 368. When a total reading is to be taken, the support is removed from bail 370 by withdrawing stem 86, thus permitting arms 372 and 373 to rock in a clockwise direction under the urging of springs 374 to draw the arms into a position cooperating with the pins 375. Then the arms are adapted to stop the accumulator wheel in a zero position regardless of the direction of rotation.

Figure 16:
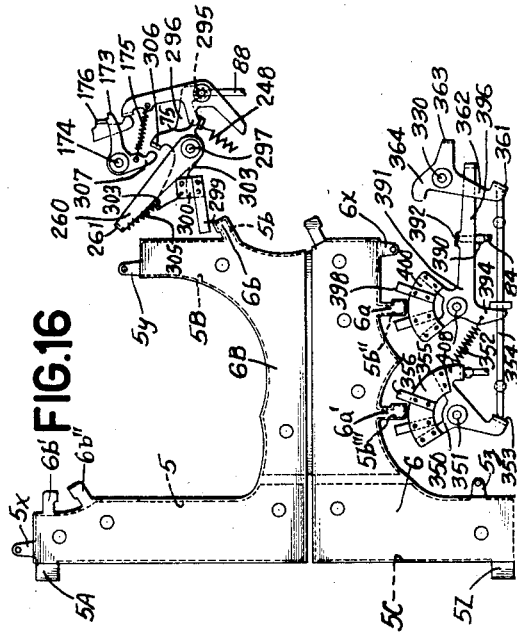
Fig. 16 shows a set of contact plates used to direct transfer controlling impulses and total printing control impulses.
Figure 13:
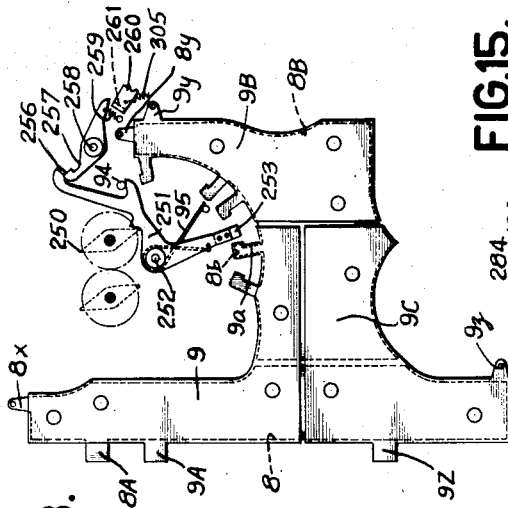
Fig. 13 is a detail view of a pair of contact switch plates used in transferring.

Attention may now be directed to the functions put into effect because of the operation of contact blade 356 (Fig. 4) and 357 caused by the operation of lever 350 under control of the positive total magnet PT. Referring to Fig. 16 it is noted that the contact blade 356 makes a connection between plate 5B formed with knife switch blade 5b''' and plate 6 formed with switch blade 6a'. This connection closes a circuit from a total power impulse initiating member and directs the created impulses through the accumulator unit in a manner to cause the wheels of the unit to revolve in a direction toward zero position which involves a time of operation sufficient to permit the printer to reach a corresponding differential position so that the amount printed represents the amount reading of the accumulator. In other words, the accumulator and printer are operated in synchronism and all that is necessary to get a total reading is to move the accumulator wheels a number of steps corresponding to the reading thereon and close circuits through the print controlling magnets in time to select a related type member for the printing of the reading.

The actuation of the accumulator in total taking is caused by impulses directed through a circuit which may be traced from line 179 (Fig. 21) through contacts 59, wire 345, wire 376, contacts 377 closed intermittently by the impulse distributor TPD, then through wire 1378 to contact tab 5Z (Fig. 16) terminal 5z (Fig. 4), wire 400, contact blade 401, contacts 402, blade 1403, wire 1404, terminal 6x, plate 6, blades 6a', 356 and 5b''' closed for the taking of a positive total, and through plate 5B formed with blade 5b''' and terminal 5y. From terminal 5y the circuit continues (Fig. 4) through wire 208 to wire 209 connected to the center blade 162. From here on the circuit continues as in adding through either contact 154 or 155, wires 212 or 215, magnets A or B, wire 213, terminal 5x, tab 5A and wire 214 (Fig. 21) to the line 180. Since the members 117 and 118 (Fig. 4) have not been shifted out of the adding position, these total taking impulses and the consequent vibration of armature 132 will cause an operation of the accumulator wheels 102, 103 in the same direction as in adding. Therefore, wheel 102 (Fig. 22) will be revolved in a clockwise direction until pin 375 is brought against the stopping face on arm 373. For example, if a wheel holds a total amount of "7", it is moved through three tooth spaces before it is stopped in normal position.

At the same time that the accumulator wheels are moved around to normal position they actuate switch closing devices to direct print controlling impulses through the printer magnet P. Part of such circuit is conditioned by the closing of a switch formed by contact blades 2a', 357 and 3a' (Fig. 19). This center blade 357 is the one previously referred to as being moved along with lever 350 (Fig. 4) when the positive total magnet is energized.

The other part of this total printing circuit may be followed on Fig. 21 from line 179, through contacts 59, wire 345, contacts 378, closed intermittently by total print timing cam TP, wire 379, contact tab 1A (Fig. 20), plate 1 formed with a switch blade 1a forming one part of a switch comprising a center blade 381 and another contact blade 2a on plate 2. This switch is closed in time to control printing by means of a lever 383 pivoted on a stud 384 and provided with a tooth formation cooperating with a cam projection 385 formed on a collar 186 attached to accumulator gear 103. The cam 385 operates lever 383 after passing the "9" position as the cam approaches the "0" or normal position. When cam 385 reaches the normal position (Fig. 9), the lever 383 is free to open switch 1a, 381, 2a. As the gear wheel 103 revolves in a counterclockwise direction during reading of a positive total, the projection 385 approaches the projection on lever 383 in synchronism with the rotation of the printing drum from 9 to 0. If the accumulator wheel should happen to be standing at "7", two steps of movement are required after the passage of the "9" type on the printer drum before the cam 385 depresses the lever 383 and rocks it into a total print circuit closing condition. The initiation of total print movement of the accumulator is brought about at the "9" point of the cycle as shown on the timing chart, Fig. 23. This timing coincides with the timing of the printer for the reading of a card which, as is well known in the art, starts with the reading of a "9" followed by the reading of an "8", and so on. In such a system the reading of the "7" follows after two steps of movement.

The circuit continues through plate 2 to contact blade 2a', blade 357 (Fig. 19), blade 3a' formed as part of plate 3, to terminal tab 3A (Fig. 21) and thence through wire 225 to plug socket 226 (Fig. 21A), plug wire 228 and wire 230 through magnet P and over to the line 180. The energized magnet P acts in the usual way to rotate a selected type member 233 to strike it against the platen 234 to form an impression of the total amount read on the accumulator.

Although the cam contact closer TPD (Fig. 21) is provided with a series of ten contact closing projections for operating contacts 377, not all of the ten impulses may be used in driving the accumulator wheels in the taking of a total reading. The number of impulses actually used depends on the number of steps that the pin 375 (Fig. 22) is removed from the stopping arms 372, 373. Should "7" be the number registered in the accumulator, only three impulses through the accumulator operating magnets A and B are actually used to move the accumulator wheels. After these three steps of movement the wheels are positively held in the zero position by the arms 372, 373. All subsequent impulses through the magnets A and B (Fig. 4) are to no avail because the armature 132 is locked through its connections with pin 375 (Fig. 22) comprising lever 137, bell cranks 112, 114 and the pawls 107 to 110 cooperating with the gear wheels 102, 103 which are locked, preventing any actuation.

If a wheel should be standing at zero when a positive total reading operation is initiated, the wheel fails to move around to close the total reading contacts. However, the printing of a zero is taken care of under control of any higher order devices which may happen to represent a significant digit. This will be carried out in accordance with the devices shown in the patents referred to hereinbefore.

*Negative total print operation*

In the reading of a negative total, a somewhat similar chain of operations is carried on in the machine. The circuit differs by the closing of contacts 334 (Fig. 21) under control of the higher order cam wheel 335 standing at "9".

When a negative total initiating circuit is directed through magnet NT the circuit may be followed on Fig. 21 from line 179, through contacts 59, wire 338, contacts 339, contacts 334, wire 386, magnet NT and wire 387 to line 180. The energized magnet attracts and closes contacts 388 to form a holding circuit. The holding circuit includes wire 346, wire 389, contacts 388, wire 386, magnet NT and wire 387. Magnet NT (Fig. 2) serves to operate rod 43 to rock bail 54 (Fig. 1) cooperating with the stem 84 (Fig. 4). The stem is guided at the upper end by a stud 390 upon which rests a lever 391. A tab 392 on the lever overlies the top of stem 84 and forms a working connection therewith. The spring 352 tends to hold the lever 391 in cooperation with the stem. An arm 394 formed as part of the lever 391 cooperates with a collar 395 fixed on horizontal rod 354 to shove the rod to the right (Fig. 4) whenever stem 84 is lifted. In this way, the negative balance taking devices operate the three-armed lever 362 to perform the various functions noted in the taking of a positive total. These operations were noted to be the movement of the non-add and non-print levers 205 and 223 to a disconnected position and at the same time the lever 370 (Fig. 22) is permitted to rock into a position wherein the arms 372 and 373 are adapted to stop an accumulator wheel when it reaches the zero position.

Turning again to lever 391 (Fig. 4) it is seen that it is formed with another arm 396 cooperating with a collar 397 attached to stem 85. The counterclockwise rotation of lever 391 results in the lifting of stem 85, the counterclockwise rocking of subtraction lever 128 and the pushing of link 129.

The operations that result from the movement of link 129 have been noted in connection with Fig. 5. There it is seen that pawls 107 and 108 are cammed out of operation while pawls 109 and 110 are permitted to engage the accumulator wheels to drive them in a direction which is the reverse of the normal adding movement. In this way, the initiation of a negative total printing operation causes the accumulator driving means to be conditioned to drive the accumulator wheels in the other direction, the reverse of the movement in taking of a positive total.

The shifted lever 391 (Fig. 4) performs a further change in connections by shifting a pair of contact blades 398 and 399 mounted thereon by an insulation sector 400.

Referring to Fig. 16 it is seen that blade 398 cooperates with a pair of switch blades 5b'' and 6a. 6a is formed as part of the plate 6 carrying the terminal 6x into which the total controlling impulses are carried. The other switch blade 5b'' is formed as part of the plate 5B carrying the terminal 5y wired to the accumulating magnets A and B.

The accumulator driving circuit for negative balance operation may be traced over a circuit starting at line 179 (Fig. 21), contacts 59, wire 345, wire 376; then the circuit branches out in two lines, the higher orders using the impulses from a pair of contacts 408 closed later than the contacts 377 used by the lower orders for reasons more fully explained hereinafter. Considering first the lower orders, the circuit continues through wire 1378, tab 5Z (Fig. 16), plate 5C, terminal 5z, wire 400 (Fig. 4) contact blade 401 contacts 402, blade 1403, wire 1404, terminal 6x, plate 6, blades 6a, 398 and 5b'', plate 5B, terminal 5y (Fig. 4), wire 208, wire 209, center blade 162.

At this point the circuit branches out so that alternate impulses are directed through contacts 154 and 155, wires 112 and 115, magnet A and magnet B, wire 213, terminal 5x, tab 5A (Fig. 21) and wire 214 to line 180. The impulses directed over the circuit just mentioned cause the rotation of accumulator wheel 103 (Fig. 9) and move the cam extension 385 (Fig. 20) to cam a projection on a lever 403 pivoted on stud 384 alongside lever 383. This lever 403 is used to time the total reading impulses during negative balance printing operation. It is operated when the accumulator wheel 103 revolves in a clockwise direction with the extension 385 moving between the "1" and the "0" positions.

Operation of lever 403 serves to place a contact plate 404 mounted thereon in contact closing position between a pair of switch blades 1a'—2b (Fig. 20). This operation serves to close part of the total reading circuit, another part of which is closed by the blade 399 (Fig. 19) inserted between blades 2b' and 3a'' when the taking of a negative total is initiated. Now the circuit for the control of the printer may be traced, it being understood that the accumulator wheels are revolving in synchronism with the movement of the printer so that the cam 385 (Fig. 9) approaches the circuit closing position along with the movement of the various type members past the printing point. The time that the printer is operated and the type member selected depend on the number of steps that the cam is removed from the switch lever 403 and the time that the total taking operation is initiated.

The circuit passes through line 179 (Fig. 21), contacts 59, wire 345, contacts 378, wire 379, tab 1A (Fig. 20), plate 1, switch blades 1a', 404 and 2b, plate 2B (Fig. 19), switch blades 2b', 399 and 3a'', plate 3, tab 3A (Fig. 21) wire 225 (Fig. 21A), plug wire 228, wire 230 and through printer magnet P to the other line 180. Since the accumulator wheels are revolving in a complemental direction to the usual direction of rotation, the complement of the number represented thereon will be recorded on a record sheet. Thus a negative balance is read out of the accumulator by reversing the direction of rotation of the wheel 103 and taking a reading on the side of the zero point opposite to the side used in positive balance readings.

A correction must be made in the higher orders when printing the negative balance. Because of the units added in these orders when passing through the zero point in subtracting amounts, the total reading would be one unit too large unless corrected. The machine of the present invention is provided with devices for so reading the higher orders in the taking of a negative balance that the true number of the balance is printed. Included in the mechanism for the correction of the negative balance print is an extra total taking impulse timer TDL (Fig. 21) cooperating with the contacts 408 previously mentioned. This impulse timer is similar to the timer TPD cooperating with contacts 377. The only difference between the two timers is in the matter of their relative starting position. Timer TDL starts sending impulses through contacts 408 one instant later than the sending of corresponding impulses through contacts 377. The lines including these two different contacts are selected in the taking of a negative balance according to the need for correction in the various accumulator orders.

The lower orders which do not need any correction are connected to contacts 377 while the higher orders which it is desired to reduce by one in the reading, are connected to the contacts 408. Since the printer is operated in synchronism with the total timers, the one step lag of timer TDL is effective to delay the energization of the printer magnets P and reduce by one unit the reading of the orders connected thereto.

The devices for connecting certain of the orders to the timer TPD while others of the orders are connected to the timer TDL include a shifting magnet SH (Fig. 4) the energization of which is determined by the position of the next lower order contact lever 263. There is one such magnet SH provided in each accumulator order. The magnet is fastened on a bracket 407 secured to the frame 81. The contact lever 263 is the same zero control lever mentioned hereinbefore in connection with description of the transferring devices. This lever carries a contact blade 91 which is adapted to make contact between blades 9b—10a when the accumulator wheel 102 assumes any position other than the zero position.

When a negative balance printing operation is selected by the closing of contacts 334 (Fig. 21) a testing circuit is directed through all of the pairs of contacts 9b—10a to test whether the wheels in the various orders stand at zero or any significant digit. The first order to the right containing a significant digit will operate the contact blade 91 and condition circuits for the direction of a negative balance correcting impulse which is then directed through the higher order shifting magnets SH.

This circuit may be traced, starting from line 179 (Fig. 21) through contacts 59, wire 338, contacts 339, contacts 334, wire 386, wire 408, contacts 409 closed early in a total taking cycle or late in the previous cycle, wire 410, contact tab 10A, plate 10 (Fig. 12), contact 10a, blade 91, contact 9b, plate 9B, terminal 9y, wire 411 (Fig. 4), stud 412, coil 413, stem 414, to the next higher order stud 415 (Fig. 11), wire 416 (Fig. 4), magnet SH, wire 417, wire 213, terminal 5x, tab 5A and wire 214 (Fig. 21) to the other line 180.

If all higher orders should stand with the accumulator wheels registering a significant digit, it is clear that consequent closure of contacts 91 and establishment of circuits such as the foregoing would cause energization of all higher order magnets SH. However, in view of the fact that certain of the higher orders may register zero, other provisions must be made to carry the circuits through such zero registering orders so that all higher order magnets SH are energized.

At the same time that a circuit is directed through the magnet SH in a higher order due to the closure of contacts 91 in the next lower order, connections are made so that if the contact lever 263 in that higher order should stand at zero, the circuit continues therethrough into the next higher order. These connections include a wire 418 (Fig. 4) attached to the wire 416 running to the shift magnet SH. The wire 418 is connected to the terminal 10y on a plate 10B (Fig. 12). This plate carries a switch blade 10b in alinement with another blade 9b' adapted to be connected by a contact blade 92 on a switch lever 263 when the lever is held in the zero position by the cooperating cam 250. When a lower order wheel contains a significant digit and the next higher order wheel is at zero, it is desired to carry the correcting impulses over into the higher order. Therefore, the connection established by blade 92 is carried through plate 9B to terminal 9y (Fig. 4) and through wire 411 and the other connections mentioned hereinbefore, leading to the next higher order magnet SH and to the other side of line 180 (Fig. 21).

By means of these connections just traced, it is apparent that when a negative balance reading operation is initiated, the magnets SH are energized in all orders higher than the order showing the first significant digit on the right.

The effects resulting from the energization of a magnet SH may be noted in Fig. 4. There it is seen that pivoted to the bracket 407 at 419 is a lever 420 carrying the armature 421 associated with magnet SH. A spring 422 tends to rock the lever 420 in a counterclockwise direction so that an extension 423 thereon is abutting against the side of bracket 407. When the magnet SH is energized, the lever 420 is urged in a clockwise direction and is latched in operated position by a latch 424 pivoted at 425 and cooperating with an offset 426 on one arm of the lever 420. The vertical arm of the lever is provided with an insulation block 427 which cooperates with the center blade 1403 of a group of blades including blades 401 and 428 forming the contacts 402 and 429. The contacts 402 were referred to hereinbefore as the contacts through which the impulses initiated by the timer TPD were directed in printing positive and negative balances. These contacts remain closed in the lower orders where no correction is needed. In all other higher orders where the magnet SH is energized, contacts 402 are opened and contacts 429 are closed for the selection of impulses directed through timer TDL in a manner about to be explained.

The delayed impulses through timer TDL (Fig. 21) pass along wire 430 and enter into contact tab 9Z. Therefore, it is the function of the contacts 429 to connect the circuit through magnets A and B established by blade 398 to tab 9Z rather than tab 5Z.

This circuit may be followed from line 179 (Fig. 21), contacts 59, wire 345, wire 376, contacts 408, wire 430, terminal 9Z (Fig. 12), plate 9C, terminal 9z (Fig. 4), wire 432, contact blade 428, contacts 429, blade 1403, wire 1404, terminal 6x (Fig. 16), plate 6, blade 6a, blade 398, blade 5b'', plate 5B, terminal 5y, wire 208, wire 209, and then through contacts 154 or 155, wires 212 or 215, magnet A or B, wire 213, terminal 5x, plate 5, tab 5A and wire 214 (Fig. 21) to the other side of the line 180.

The impulse carrying connections just traced are effective to delay the operation of magnets A and B for one step of operation and thereby delay the operation of blade 404 (Fig. 9) and energization of magnet P, so that all orders above the order showing the first significant digit on the right in the accumulaor will print a correct digit which is one less than the digit otherwise printed by the total driving connections through magnets A and B.

In the printing of a negative balance, when an accumulator wheel stands at zero in an order higher than the order carrying the first significant digit, it is desired that a "9" be printed to represent a number in this order. The reason for this is that when a higher order wheel is in such a condition, it is an indication that nine units have been subtracted out of the order and the numeral 9 should be printed. The ordinary total printing devices including blade 404 are not adapted to print a "9" under such conditions, therefore, the machine is provided with other circuit closing devices for directing a controlling impulse through orders in such a condition at a time to actuate the printer to cause the printing of the digit "9". The devices for bringing about this operation include a contact blade 90 mounted on one of the arms of the switch lever 263 (Figs. 4 and 20). Also included in these devices is a switch lever 433 (Fig. 4) pivoted on stud 360 and provided with a blade 434 adapted to close knife switch blades 2c'—3b.

The spring 247 normally holds the lever 433 out of contact-making position and into cooperation with the offset 426 on lever 420. When the magnet SH is energized and the lever 420 is rocked in a clockwise direction, the offset 426 turns the lever 433 in a counterclockwise direction to close the connection between 434 and blades 2c'—3b. Thus, between the blades 90 and 434 of an order there is set up a line of connections adapted to direct the first impulse initiated by the total printing timer TP (Fig. 21) into the related printer magnet P to cause the early energization thereof and the consequent selection of the "9" printing hammer to cause the corrected printing of a higher order accumulator wheel standing at zero during the printing of a negative balance. The circuit may be traced from line 179 (Fig. 21), contacts 59, wire 345, contacts 378, wire 379, tab 1A, plate 1 (Fig. 20), blades 1a", 90 and 2c, plate 2C (Fig. 19), blades 2c', 434 and 3b, plate 3B, terminal 3y, wire 435, terminal 2y, blades 2b', 399 and 3a", plate 3, tab 3A (Fig. 21), wire 225 (Fig. 21A), plug socket 226, plug wire 228, plug socket 229, wire 230, printer magnet P and line 180.

Near the end of the operation in taking a negative balance reading, the levers 420 (Fig. 4) are restored to normal position by the tripping of latch 424. This is brought about by means of a bell crank 436 pivoted at 437 with a horizontal arm underlying a projection 407 on the negative balance operating arm 391 operated by stem 84. The vertical arm of bell crank 436 cooperates with an offset 438 formed at the lower end of latch 424.

When the lever 391 is rocked in a counterclockwise direction for the selection of a negative balance reading operation, the bell crank 436 is free to rock in a clockwise direction to permit the latching of latch 424 under the projection 426 on lever 420. However, near the end of the operation when lever 391 is restored, bell crank 436 is rocked in a counterclockwise direction to force latch 424 out of cooperation with lever 420, thus permitting spring 422 to move the lever so that contacts 402 are again closed.

*Nonreset operation*

At times it may be desirable to print either a positive or negative total without resetting the accumulator to zero. In other words, in Fig. 9, the cam projection 385 may operate lever 383 or lever 403 in turning during total taking operation without stopping at zero. For this sort of an operation the wheels are moved ten steps by the usual operation of cam contacts 377 or 408 (Fig. 21) ten times during total taking, while at the same time arms 372, 373 (Fig. 22) are held out of the path of the resetting studs 375.

Since the usual operation of total taking causes the rocking of lever 370 and control arms 372 and 373, it is necessary to provide some means to counteract the lowering of stem 86 (Fig. 4) when arm 366 is lowered below collar 369. This means includes a magnet NR (Figs. 2 and 21) adapted to operate connections for raising stem 86. The connections are made effective by the closing of switch 449. The path followed by the impulse controlling the prevention of resetting during totaling may be followed from line 179 (Fig. 21) through contacts 59, wire 345, switch 449 closed for prevention of resetting, wire 451, magnet NR and wire 452 to line 180.

The energized magnet NR acts to operate rod 45 (Fig. 2) and lifts bail 56 underneath stem 86 (Fig. 4) thus restoring this stem to the raised position it normally occupies under the urging of spring 368. In this way lever 370 is rocked in a counterclockwise direction and the stop arms 372, 373 (Fig. 22) are held out of the path of pins 375 so that the accumulator wheels may move the full ten steps provided for in the total taking operation. This kind of operation results in the taking of a progressive or subtotal where the number or balance held by the accumulator is printed and at the same time the accumulator is restored to a condition wherein it retains the amount printed.

The invention is described in connection with a single operative embodiment, but it will be understood that many modifications will readily occur to those skilled in the art without departing from the spirit of the invention. It is the intention therefore, to be limited only as indicated by the scope of the claims which follow.

What is claimed is as follows:

1. In an accumulating device, rotatable accumulating means, a pair of magnets, means under control of said magnets for operating said rotatable accumulating means, means under control of said magnets for making said magnets effective alternately, means for energizing the effective one of said magnets to initiate operation of said rotatable means, an impulse emitter, and means under control of the effective initially energized magnet for connecting said alternating means and said magnets to said impulse emitter.

2. In an accumulating device, a pair of magnets, a common armature suspended between said magnets, a pair of levers connected to said armature for oscillation, two sets of pawls mounted on said levers, a pair of accumulating wheels with which the pawls cooperate, said wheels being geared together for conjoint operation, and means for selectively disengaging either set of pawls from said wheels to cause operation in addition or subtraction.

3. In an accumulating device, a pair of magnets, a common armature suspended between said magnets, a pair of levers connected to said armature for oscillation, two sets of pawls mounted on said levers, a pair of accumulating wheels with which the pawls cooperate for positive operation in both directions of oscillation of said levers, said wheels being geared together for conjoint operation, means for selectively disengaging either set of pawls from said wheels to cause operation in addition or subtraction, and a magnet for controlling said selective means to disengage one set of pawls.

4. In an accumulating device, a pair of magnets, a common armature suspended between said magnets, a pair of levers connected to said armature for oscillation, two sets of pawls mounted on said levers, a pair of accumulating wheels with which the pawls cooperate, said wheels being geared together for conjoint operation, means for selectively disengaging either set of pawls from said wheels to cause operation in addition or subtraction, and record controlled means for operating said selective means to disengage one set of pawls.

5. In an accumulating device, rotatable accumulating means, a pair of magnets, means for energizing said magnets alternately in a single cycle of operation, pawls cooperating with said accumulating means, means operated by said magnets under control of said alternate energizing means for moving said pawls, and means for controlling said pawls for operating said accumulating means in either direction, said pawls facing in opposite directions in cooperation with said accumulating means and operated back and forth by said moving means, whereby each alternate energization of the two magnets rotates the accumulating means in the same direction.

6. In an accumulating device, a pair of magnets, a common armature oscillated between said magnets, pawl carrying means operated by said armature, a pair of oppositely facing pawls on said carrying means, a pair of meshing accumulating gears with which said pawls cooperate separately, whereby alternate energization of said magnets causes the gears to be rotated in a single direction.

7. In a record controlled accumulating device with each record bearing a representation located differentially to represent a digit, a pair of magnets, means for distributing a series of impulses, means controlled by said magnets for making said magnets effective alternately to receive said impulses, contacts normally open between said magnets and said distributing means, means for sensing said representation on said record, means for moving the record relative to said sensing means, means for directing a differentially timed impulse from said sensing means to the effective one of said magnets, means under control of the energized effective magnet for closing said contacts to connect the magnets to the impulse distributing means, rotatable accumulating means, and devices under control of said magnets for operating said rotatable accumulating means to add the digit represented on the record.

8. In a machine of the class described, a pair of magnets, a common armature oscillated between said magnets, pawl carrying means operated by said armature, a pair of oppositely facing pawls on said carrying means, a rotatable accumulating means comprising a pair of meshing accumulating gears with which said pawls cooperate separately, a total key, means under control of said total key for energizing said pair of magnets alternately ten times to effect operation of said accumulating means in taking a total, a projection on one of said accumulating gears, and a resetting latch cooperating with said projection to stop and hold said accumulating gears in zero position against further actuation by said magnetically operated pawls when the zero position is reached during the total taking operation.

9. In a machine of the class described, a pair of magnets, a common armature oscillated between said magnets, pawl carrying means operated by said armature, a pair of oppositely facing pawls on said carrying means, a rotatable accumulating means comprising a pair of meshing accumulating gears with which said pawls cooperate separately, a total key, means under control of said total key for energizing said pair of magnets alternately ten times to effect operation of said accumulating means in taking a total, a projection on one of said accumulating gears, a resetting latch cooperating with said projection to stop and hold said accumulating gears in zero position against further actuation by said magnetically operated pawls when the zero position is reached during the total taking operation, a magnet for controlling the movement of said resetting latch into an effective position, and means for selectively energizing said resetting magnet during a total taking operation.

10. In a machine controlled by records with differentially located perforations representing amounts, means for sensing said perforations, means for moving said records relative to said sensing means, a pair of magnets, a pair of accumulating wheels geared together for rotation, two sets of pawls for operating said wheels in either direction, a pair of levers supporting said pawls, means operated by said magnets and connected to said levers for oscillating the pawls, means under control of said magnets for making said magnets effective alternately, means under control of said sensing means for energizing the effective one of said magnets to initiate operation of said wheels, an impulse emitter, means under control of the effective initially energized magnet for connecting said alternating means and said magnets to said impulse emitter, devices for camming either set of pawls out of operation, and means under control of special perforations in the records for operating said camming devices.

11. In an accumulating device, a plurality of rotatable accumulating means of different denominational orders, pairs of magnets, one pair for each order, means for distributing a series of impulses, means for initiating operation of said magnets, means under control of said magnets and said initiating means for controlling said distributing means to direct a differential number of said impulses through said magnets alternately, an actuator associated with each pair of magnets and operated thereby in both directions when they are energized alternately, connections between each actuator and a related accumulating means for turning the accumulating means in either direction a step for each operation of the actuator, means for adjusting said connections to determine the direction of operation of said plurality of accumulating means, contact devices closed by a lower order accumulating means when moved ten steps from normal position in either direction, and means under control of said contact devices for sending an additional impulse through either magnet of the next higher order to operate the related actuator and accumulating means one additional step in either direction.

12. In an accumulating device, rotatable accumulating means, a pair of magnets, pawls for actuating said rotatable means, means under control of said magnets for operating said pawls to turn said rotatable means, means for adjusting said pawls to turn said rotatable means in either direction, means under control of said magnets for making said magnets effective alternately, means for energizing the effective one of said magnets to initiate operation of said rotatable means at a differential time, an impulse emitter, and means under control of the effective initially energized magnet for connecting said alternating means and said magnets to said impulse emitter to receive impulses the number of which is dependent on the time of initiation.

FRED M. CARROLL.
ARTHUR F. SMITH.